United States Patent [19]
Pengov

[11] Patent Number: 6,054,819
[45] Date of Patent: Apr. 25, 2000

[54] DRIVING CIRCUIT FOR SWITCHED RELUCTANCE MACHINES

[75] Inventor: Wayne A. Pengov, Chardon, Ohio

[73] Assignee: Tridelta Industries, Inc., Mentor, Ohio

[21] Appl. No.: 09/080,033

[22] Filed: May 15, 1998

[51] Int. Cl.[7] ............................................. H02K 23/00
[52] U.S. Cl. ............................................ 318/254; 318/701
[58] Field of Search .................................. 318/701, 254, 318/720, 724

[56] References Cited

U.S. PATENT DOCUMENTS

| | | | |
|---|---|---|---|
| Re. 35,189 | 3/1996 | Müeller | 318/254 |
| 3,742,330 | 6/1973 | Hodges et al. | 321/9 A |
| 4,074,179 | 2/1978 | Kuo et al. | 318/696 |
| 4,127,801 | 11/1978 | Leenhouts | 318/696 |
| 4,208,623 | 6/1980 | Leenhouts | 318/696 |
| 4,295,083 | 10/1981 | Leenhouts | 318/696 |
| 4,496,886 | 1/1985 | Gordon et al. | 318/254 |
| 4,500,824 | 2/1985 | Miller | 318/701 |
| 4,570,212 | 2/1986 | Edwards et al. | 363/138 |
| 4,620,138 | 10/1986 | Müller | 318/254 |
| 4,684,867 | 8/1987 | Miller et al. | 318/701 |
| 4,763,056 | 8/1988 | Byrne et al. | 318/701 |
| 4,783,795 | 11/1988 | Yahata | 378/105 |
| 5,084,662 | 1/1992 | Palaniappan et al. | 318/701 |
| 5,115,181 | 5/1992 | Sood | 318/701 |
| 5,144,215 | 9/1992 | Bahn | 318/701 |
| 5,446,359 | 8/1995 | Horst | 318/701 |
| 5,530,333 | 6/1996 | Turner | 318/701 |
| 5,589,752 | 12/1996 | Iwasaki et al. | 318/701 |
| 5,703,456 | 12/1997 | Cox | 318/701 |

FOREIGN PATENT DOCUMENTS

| | | | |
|---|---|---|---|
| 0 599 334 A2 | 11/1993 | European Pat. Off. | H02P 6/00 |
| 797047 | 1/1981 | Russian Federation | H02P 7/36 |
| 2 208 456 | 3/1989 | United Kingdom | H02P 6/028 |
| WO 89/01260 | 2/1989 | WIPO | H02P 6/02 |

OTHER PUBLICATIONS

"Saturation in doubly salient reluctance motors", by J.M. Stephenson and M.A. El–Khazendar, *IEE Proceedings*, vol. 136, pp. 50–58, Jan. 1989.

"Power convertor circuits for switched reluctance motors with the minimum number of switches", by C. Pollock and Prof. B.W. Williams, *IEE Proceedings*, vol. 137, pp. 373–384, Nov. 1990.

"Brushless reluctance–motor drives", by Tim Miller, *IEE Proceedings*, 1987.

"Computer Aided Design of Electrical Machines for Variable Speed Applications", by R. Krishnan, S. Aravind and P. Materu, *IECON '87*, pp. 756–763, 1987.

Journal article entitled "An Integrated Approach to Switched Reluctance Motor Design", by C. Pollock and B.W. Williams, pp. 865–870.

"Dynamic Operation", by T.J.E. Miller, *Switched Reluctance Motors and their Control*, pp. 53–70, 1993.

"Power Electronic Controller", by T.J.E. Miller, *Switched Reluctance Motors and their Control*, pp. 85–97, 1993.

Primary Examiner—David Martin
Attorney, Agent, or Firm—Arter & Hadden LLP

[57] ABSTRACT

A driving circuit for a multi-phase switched reluctance (SR) machine, wherein a reduced number of wire connections between the machine and driving circuit are needed. In addition, one embodiment of the driving circuit requires the use of fewer individual diodes for the circuit design. The reduction in the number of wire connections and diodes provides greater reliability, improved efficiency, and lower production costs.

32 Claims, 13 Drawing Sheets

POSITIVE VOLTAGE LOOP

ZERO VOLTAGE LOOP

NEGATIVE VOLTAGE LOOP

POSITIVE VOLTAGE LOOP

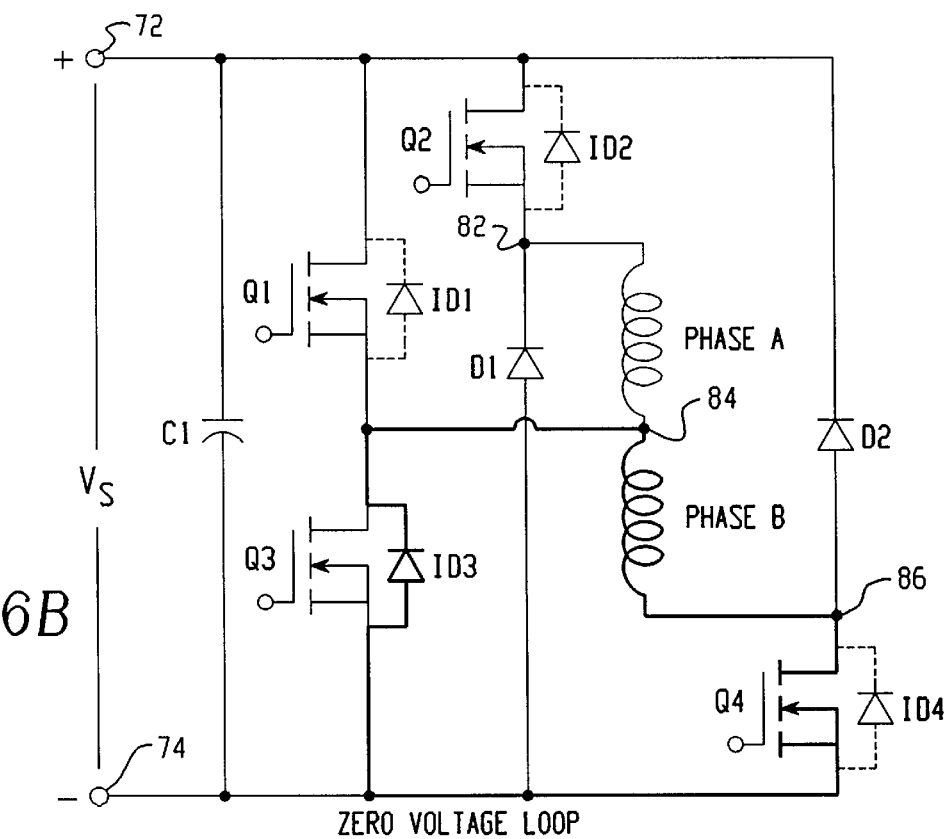
Fig. 6B  ZERO VOLTAGE LOOP
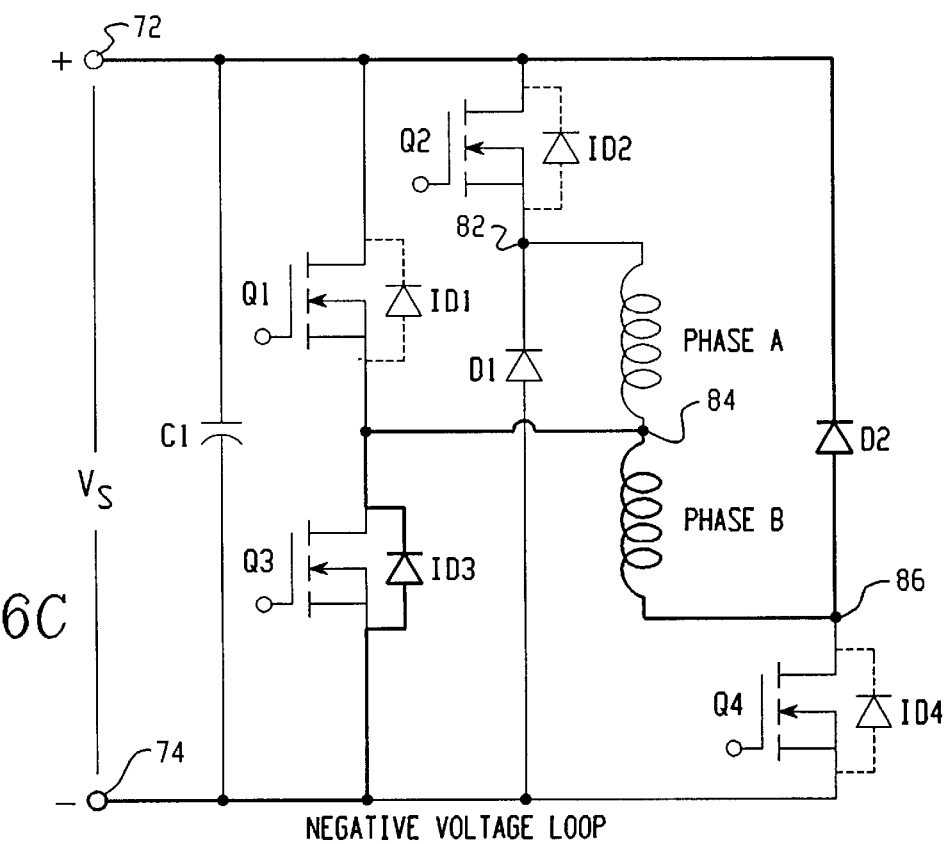
Fig. 6C  NEGATIVE VOLTAGE LOOP

DRIVING CIRCUIT FOR SWITCHED RELUCTANCE MACHINES

FIELD OF INVENTION

The present invention generally relates to a driving circuit, and more particularly to a driving circuit for multi-phase SR machines.

BACKGROUND OF THE INVENTION

There are numerous driving circuits known in the prior art for energizing switched reluctance (SR) machines, such as those shown in FIGS. 1A and 1B. One commonly used circuit is comprised of an independent "half-bridge" for each phase. FIG. 2 illustrates such a circuit 100 for a two-phase machine. Circuit 100 uses two switches SA1 and SA2 and two freewheeling diodes DA1 and DA2 for phase winding A. Likewise, this circuit uses two switches SB1 and SB2 and two freewheeling diodes DB1 and DB2 for phase winding B. Phase windings A and B are respectively connected to the circuit at connections CA1, CA2 and CB1, CB2. Accordingly, 2N wire connections are needed to connect a typical drive circuit to an SR machine having N phases.

Another well known SR machine driving circuit, known as the "Oulton" (TM) driving circuit 102, is shown in FIG. 3, as configured for two phases. While driving circuit 102 requires only three connections (CN1, CN2 and CN3) for connection to an SR machine having 2 phases, Oulton driving circuit 102 requires the use of two capacitors (CB1 and CB2). The DC link voltage is split with the capacitors.

Other prior art SR machine driving circuits are described in "Switched Reluctance Motors and Their Control" (1993) by T. J. E. Miller, as well U.S. Pat. Nos. 5,075,610; 5,084,662 and 5,115,181.

For driving circuits requiring 2N connections (where N is the number of phases) there are several disadvantages. Where the driving circuit is located remote from the machine, a large number of wire connections can be costly, and result in reliability and efficiency problems. In cases where long wire leads are needed to connect the SR machine with the drive circuit (e.g., where the SR machine is to be located in a deep well) a substantial cost is incurred for the wires. Reliability is also a potential problem, since the more wire leads needed, the greater the chance for disconnection of a wire at the machine or drive circuit. Moreover, there are more opportunities for a wire to be severed along the length thereof. With regard to efficiency, potential energy loss may increase with the number of wires.

In the case of the prior art SR machine driving circuits requiring fewer than 2N connections, other drawbacks are encountered. In this regard, these driving circuits may require additional circuit elements (e.g., capacitors or inductors), require a split supply, prohibit phase overlap, or lack all three modes of operation (i.e., positive voltage loop, zero voltage loop and negative voltage loop).

In view of the foregoing, there is a need for a driving circuit which reduces the number of connections needed per phase, but does not have the drawbacks associated with prior art driving circuit designs.

SUMMARY OF THE INVENTION

According to the present invention there is provided a driving circuit for multi-phase switched reluctance machines.

An advantage of the present invention is the provision of an SR machine driving circuit which reduces the number of wires needed to connect a multi-phase SR machine to the driving circuit.

Another advantage of the present invention is the provision of an SR machine driving circuit which reduces the number of individual freewheeling diodes.

Still another advantage of the present invention is the provision of an SR machine driving circuit which reduces the losses associated with the current exiting the machine and being re-routed back from the driving circuit.

Yet another advantage of the present invention is the provision of an SR machine driving circuit which requires only two power leads for a two phase SR machine.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIGS. 6A–6C show current flow in the driving circuit of FIG. 4, in various modes of operation during excitation of the phase B windings;

DETAILED DESCRIPTION OF THE PREFERRED EMBODIMENT

Figure 1A:
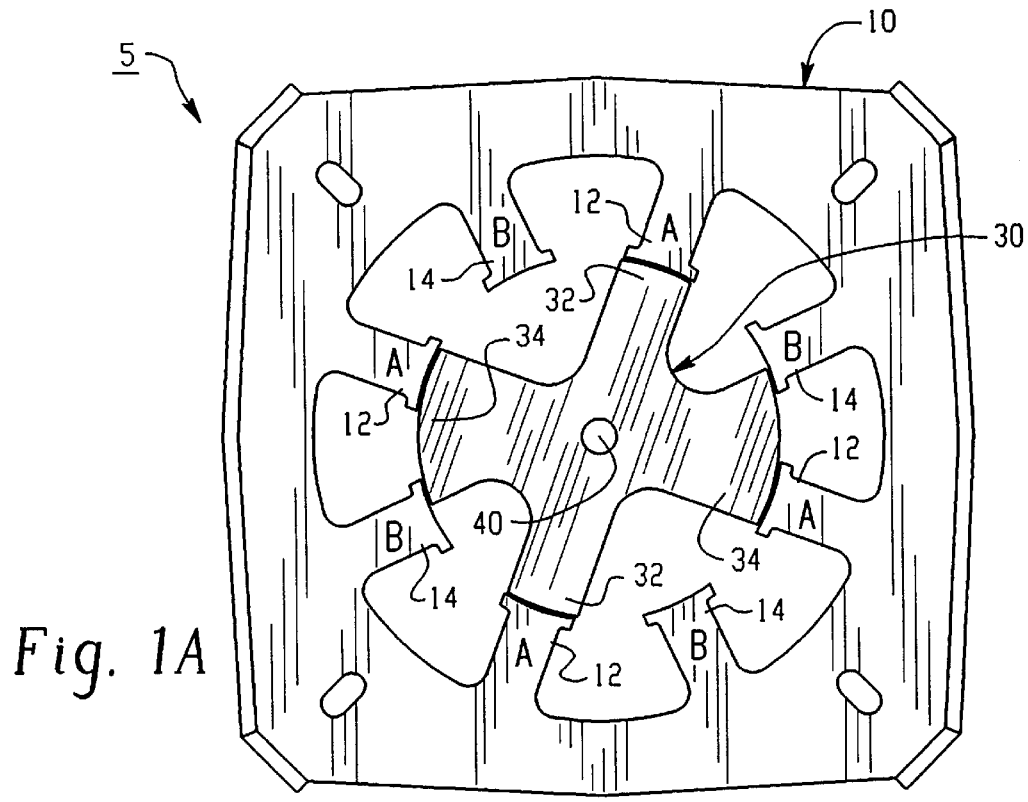
FIG. 1A illustrates an exemplary two-phase "staggered-tooth" switched reluctance motor.

Referring now to the drawings wherein the showings are for the purposes of illustrating a preferred embodiment of the invention only and not for purposes of limiting same, FIG. 1A illustrates an exemplary SR motor 5. In particular, SR motor 5 is a two phase "staggered-tooth" switched reluctance motor. It should be appreciated that the term "switched reluctance," as used herein, is also intended to refer to "variable reluctance" and "synchronous reluctance." Moreover, while the present invention is described with particular reference to a switched reluctance motor, the present invention also finds application in connection with a switched reluctance generator.

Figure 1B:
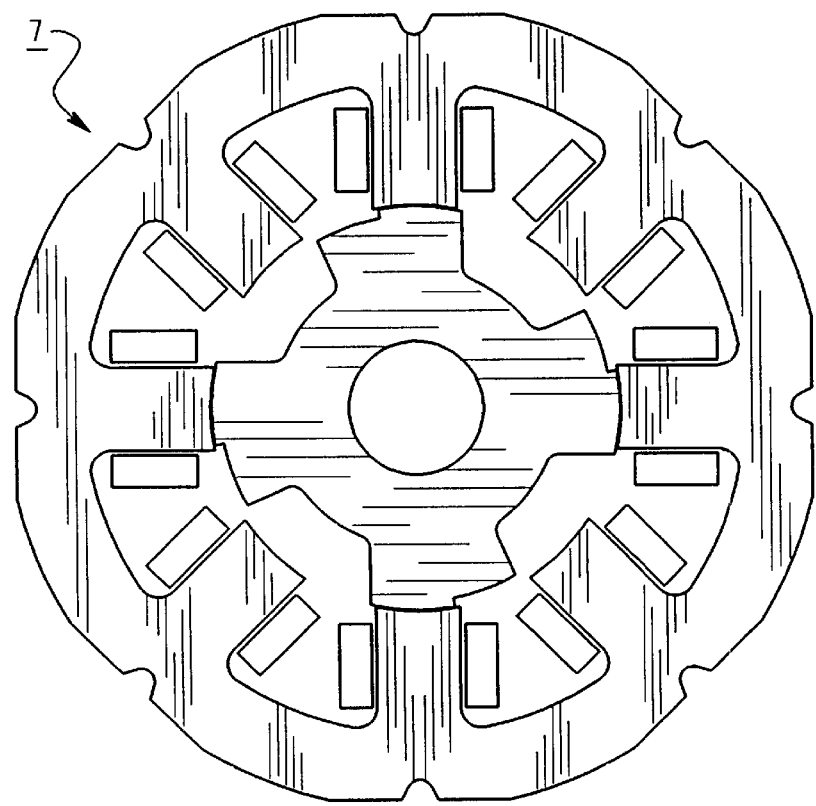
FIG. 1B illustrates an exemplary two-phase "stepped-gap" switched reluctance motor.

Motor 5 is generally comprised of a stator 10 and a rotor 30. Stator 10 includes stator poles 12 and 14. Each stator pole 12 and 14 is surrounded by a winding (not shown) of one or more turns of electrically conductive material and appropriate insulation. Each phase winding is a set of connected windings respectively wound on stator poles 12 (phase A) and stator poles 14 (phase B). Rotor 30 includes two sets of rotor poles 32 and 34. Rotor poles 32 and 34 differ from each other with regard to their size. As a result, motor 5 is referred to as a "staggered-tooth" SR motor. It should be appreciated that motor 5 is shown solely for the purpose of illustrating a preferred embodiment of the present invention, and that the present invention is suitably used with other SR machine designs. For instance, the present invention is suitably used in connection with exemplary "stepped-gap" SR motor 7 shown in FIG. 1B, as well as more conventional SR machine designs.

The phase A and phase B windings are grouped together so that a balanced torque is produced in the motor when the windings are excited from an external source of electrical energy. A variation in reluctance occurs when rotor 30 is rotated with respect to stationary stator poles 12, 14. The variation in reluctance is the result of the variation in the inductance of the phase windings, as is well known by those of ordinary skill in the art.

When the respective phase winding is excited with an electrical current as the inductance is increasing from minimum to maximum, a motor torque is developed on shaft 40. In contrast, when the respective phase winding is excited as the inductance is decreasing from a maximum to a minimum, torque opposing the direction of rotation is developed on shaft 40 (i.e., generator torque).

The switching or "excitation" of the phase windings is typically accomplished by solid state switching devices such as MOSFETS, transistors, thyristors, insulated gate bipolar transistors (IGBTs), and the like, including combinations thereof. However, benefits of the present invention are most realized when MOSFETS are used, since they include intrinsic diodes, as will be explained in detail below.

Figure 4:
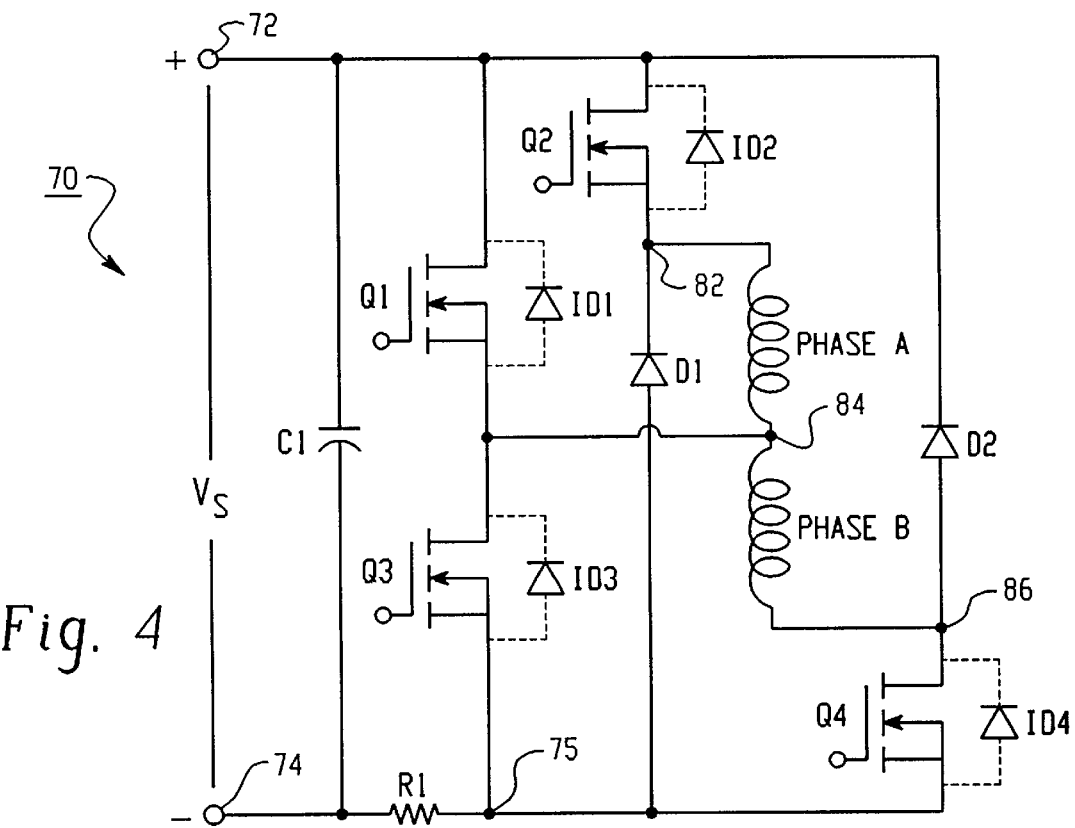
FIG. 4 is a schematic of a driving circuit according to a preferred embodiment of the present invention.

FIG. 4 illustrates a driving circuit 70 for driving a 2-phase SR motor in accordance with a preferred embodiment of the present invention. Driving circuit 70 is generally comprised of phase windings A and B, switches Q1, Q2, Q3 and Q4, and a pair of individual freewheeling diodes D1 and D2. Switches Q2 and Q3 are associated with phase winding A, and switches Q1 and Q4 are associated with phase winding B, as will be described below. It should be appreciated that since MOSFETS are used as the preferred switching device, circuit 70 includes intrinsic diodes ID1, ID2, ID3 and ID4, respectfully associated with switches Q1, Q2, Q3 and Q4. Switches Q1, Q2, Q3 and Q4, each have three electrodes, one of which is a control electrode for controlling the turning ON and OFF of the respective switch. A capacitor C1 filters the DC energy source (supply voltage Vs). Supply voltage Vs provides a source of electrical energy to driving circuit 70. It should be appreciated that the MOSFETS can also be used as synchronous rectifiers, and reduce power ($I^2R$) losses. An optional sense resistor R1 may be arranged between terminals 74 and 75. This allows the current flowing through the supply voltage Vs to be measured by a suitable current sensing circuit. As a result, the current flowing through the phase windings can be measured.

It should be understood that a switching controller (not shown) generates control signals to control the switching of switches Q1, Q2, Q3 and Q4. The control signals are generated in accordance with prior art techniques and may be in response to sensor signals, pre-programmed signals (e.g., stored in ROM), manually-controlled signals, or a combination thereof. The design of the switch controller does not form a part of the present invention, except that it must be capable of operating switches Q1, Q2, Q3 and Q4 to provide appropriate gate trigger signals. It should be appreciated that the sequence of current flow for each phase winding may take many suitable forms, including sequential or overlapping.

Driving circuit 70 has three basic modes of operation for current control, namely, a positive voltage loop (PVL), a zero voltage loop (ZVL) and a negative voltage loop (NVL). During the PVL mode a positive voltage is applied across the respective phase winding, generally resulting in an increase in the current flowing therethrough. During the ZVL mode a short circuit is placed across the respective phase winding. However, with practical circuit components, the current in the respective phase winding will slowly decay, as the energy is dissipated in the phase winding resistance. As a result, a ZVL mode is usually alternated with a PVL mode to regulate the current in the respective winding (i.e., "chopping"). Lastly, in the NVL mode a negative voltage is applied across the respective phase winding. This causes the current in the respective phase winding to fall as energy is returned from the respective phase winding to the supply voltage Vs. It will be appreciated that an important advantage of the present invention is the redirection of a portion of the current to the adjacent phase during the transition without exiting the motor. This results in a significant improvement in efficiency.

Figure 5A:
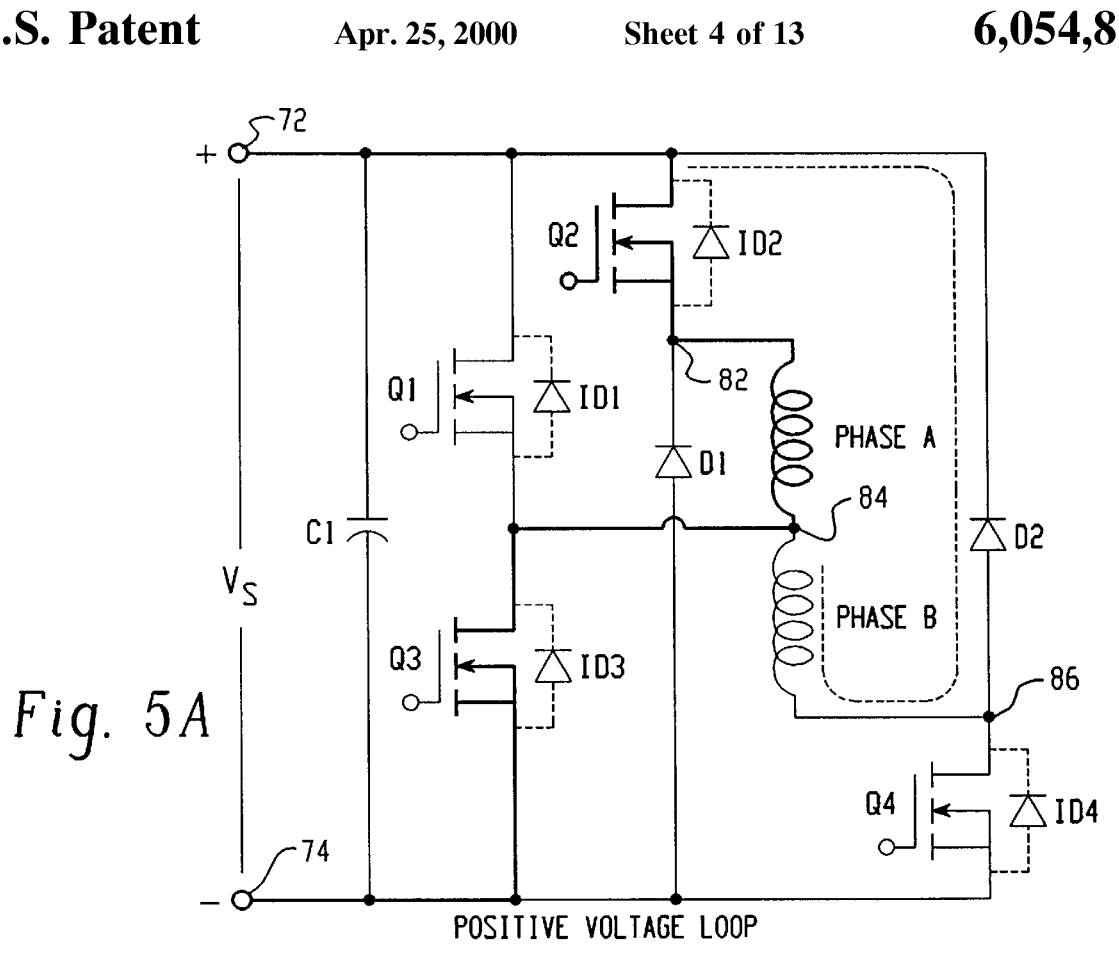
FIGS. 5A–5C show current flow in the driving circuit of FIG. 4, in various modes of operation during excitation of the phase A windings.
Figure 5B:
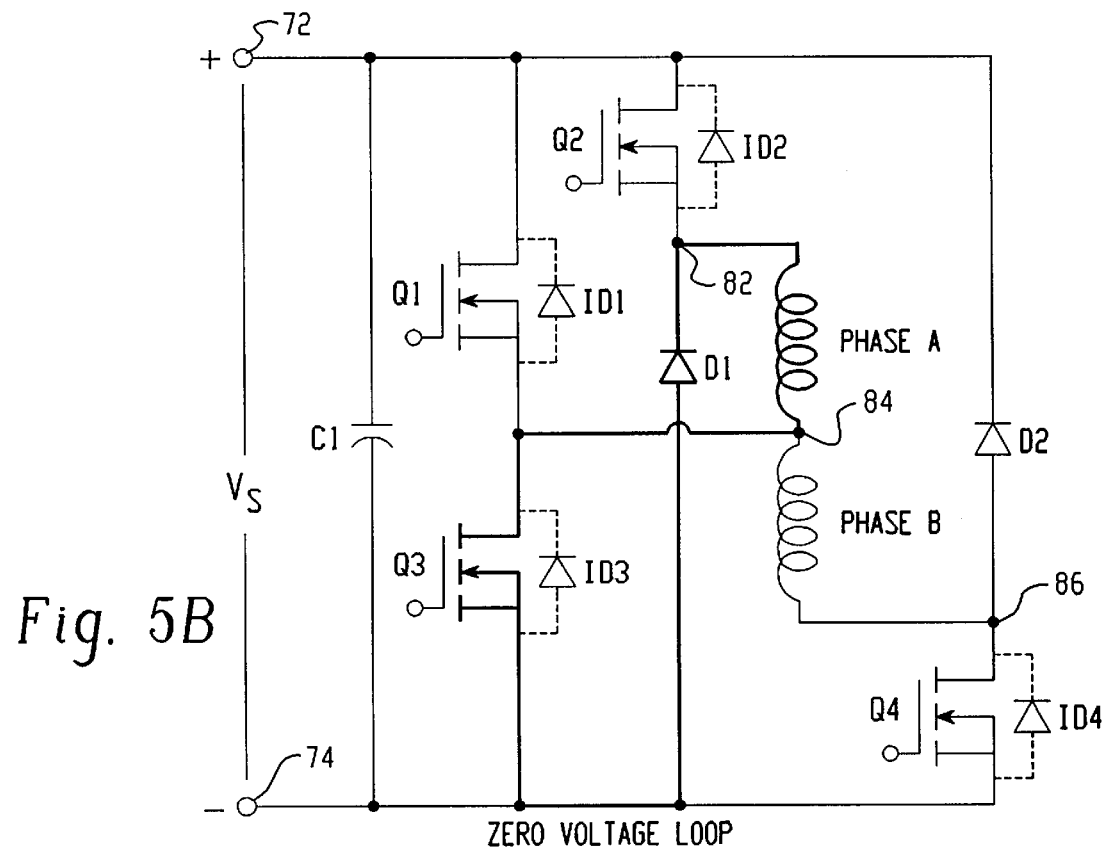
Figure 5C:
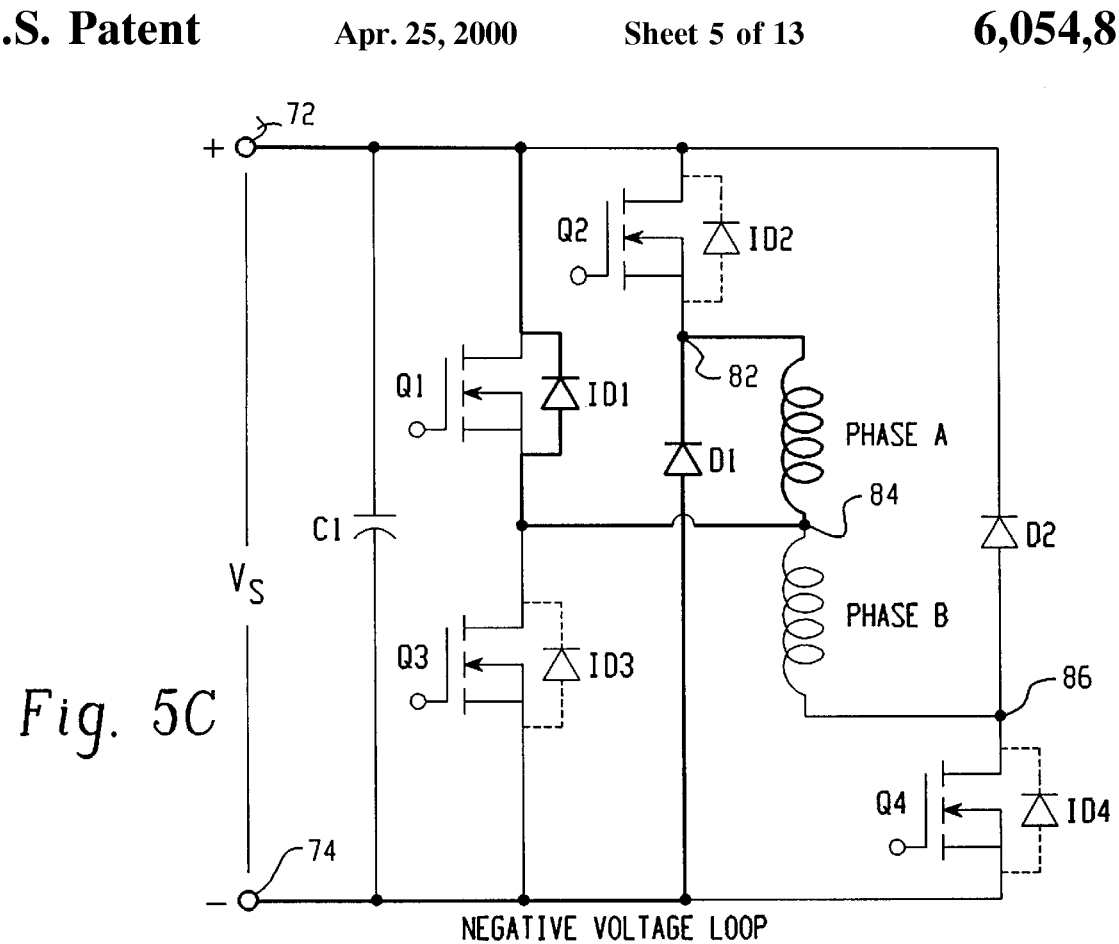
Figure 6A:
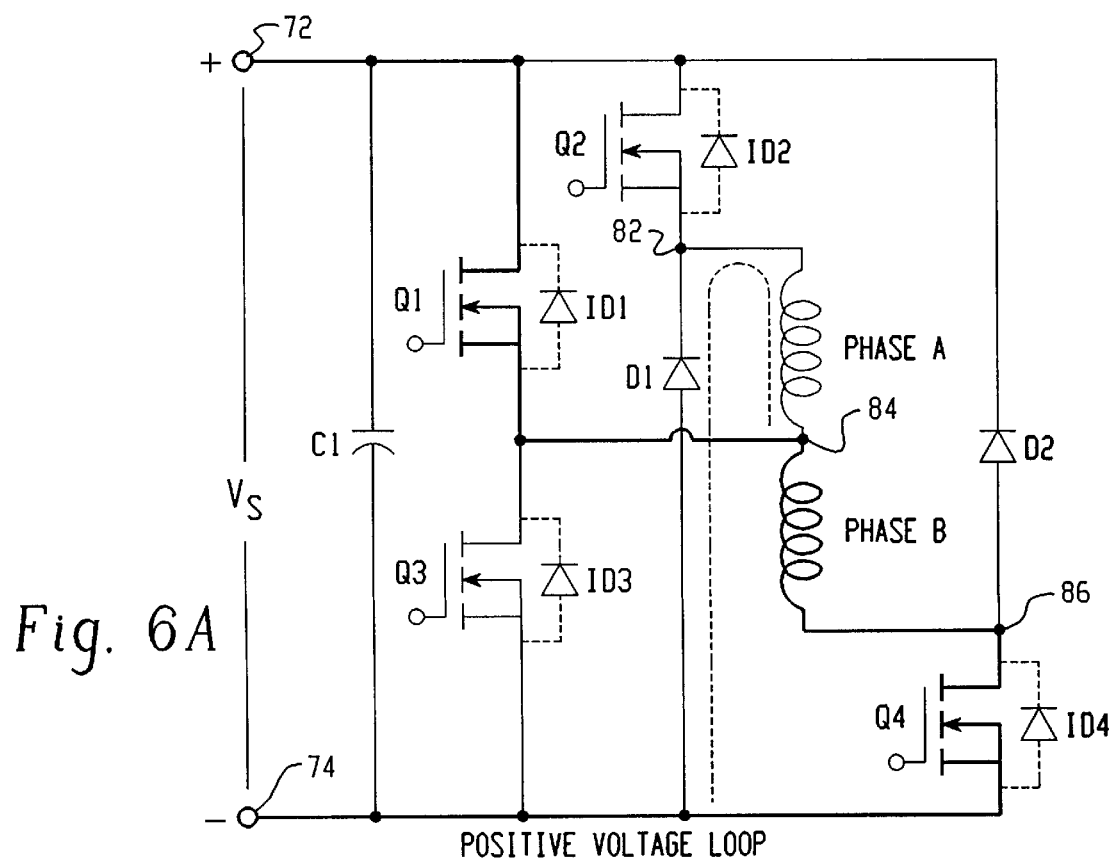

Operation of driving circuit 70 in each of the foregoing modes will now be described in detail with reference to FIGS. 5A–5C and 6A–6C. FIGS. 5A–5C illustrate circuit operation during the excitation period for phase A, while FIGS. 6A–6C illustrate circuit operation during the excitation period for phase B.

To begin phase A excitation, switches Q2 and Q3 are switched ON. As a result, the positive terminal 72 of DC supply voltage Vs is connected to terminal 82 of phase winding A, and the negative terminal 74 of DC supply voltage Vs is connected to terminal 84, which is a common node shared by phase windings A and B. Diodes D1, D2 are reverse biased. Accordingly, supply voltage Vs is applied to the inductors comprising phase winding A in a positive voltage loop (PVL). This results in an increase in the phase A current. Current flows in the following loop (FIG. 5A): phase winding A—switch Q3—supply voltage Vs—switch Q2.

When the peak current level is reached, switch Q2 is turned OFF, while switch Q3 remains ON. As a result, freewheeling diode D1 becomes forward biased. Accordingly, terminal 82 is connected to negative terminal 74 through diode D1. Since switch Q3 remains ON, terminal 84 is also connected to negative terminal 74. Therefore, the inductors comprising phase winding A are short circuited in a zero voltage loop (ZVL). The current flows in the following loop (FIG. 5B): phase winding A—switch Q3—diode D1.

As indicated above, the phase A current will slowly decay. To maintain the current in phase winding A for the desired duration, switch Q2 is toggled between ON and OFF. When switch Q2 is ON, the circuit returns to the PVL mode, whereas, when switch Q2 is OFF, the circuit returns to the ZVL mode. The changes in the phase A current are observed as ripples in the current waveforms shown in FIGS. 8A and 8B, which are described below. It should be understood that alternatively switch Q2 may remain ON, while switch Q3 is toggled OFF and ON.

When it is the appropriate time to decrease the phase A current to zero, switches Q2 and Q3 are both turned OFF. As a result, diode D1 and intrinsic diode ID1 of switch Q1 become forward biased. As a result, the current flows in a NVL as follows (FIG. 5C): phase winding A—intrinsic diode ID1—supply voltage Vs—diode D1. It should be understood that all switches Q1, Q2, Q3 and Q4 will typically remain OFF for only a relatively short period of time.

To begin the subsequent excitation of the phase B winding, switches Q1 and Q4 are turned ON. Therefore, current flows in a PVL as follows (FIG. 6A): phase winding B—switch Q4—supply voltage Vs—switch Q1. Consequently, the current in the inductors comprising phase winding B will steadily increase. The phase A winding will remain in an NVL, as shown by the dashed lines of FIG. 6A, during at least a portion of the phase B winding PVL. In this respect, the current flowing through the phase A winding may reduce to zero before, concurrent with, or after, the current flowing through the phase B winding has reached its peak level (i.e., the end of the phase B PVL).

When the peak current level is reached, switch Q1 is turned OFF. As a result, intrinsic diode ID3 of switch Q3 becomes forward biased. Therefore, current flows in a ZVL as follows (FIG. 6B): phase winding B—switch Q4—intrinsic diode ID3. This results a gradual decay in the phase B current. To maintain the current for the desired duration, switch Q1 is toggled between ON and OFF. When switch Q1 is ON, the circuit is in the PVL mode, and when switch Q1 is OFF, the circuit is in the ZVL mode. It should be understood that alternatively switch Q1 may remain ON, while switch Q4 is toggled OFF and ON.

When it is the appropriate time to decrease the phase B current to zero, switches Q1 and Q4 are both turned OFF. As a result, diode D2 and intrinsic diode ID3 become forward biased. Therefore, the current flows in a NVL as follows (FIG. 6C): phase winding B—diode D2—supply voltage Vs—intrinsic diode ID3. It should be understood that all switches Q1, Q2, Q3 and Q4 will typically remain OFF for only a relatively short period of time.

To begin the subsequent excitation of the phase A winding, switches Q2 and Q3 are turned ON. Therefore, current flows in a PVL as follows (FIG. 5A): phase winding A—switch Q3—supply voltage Vs—switch Q2. Consequently, the current in the inductors comprising phase winding A will steadily increase. The phase B winding will remain in an NVL, as shown by the dashed lines of FIG. 5A, during at least a portion of the phase A winding PVL. In this respect, the current flowing through the phase B winding may reduce to zero before, concurrent with, or after, the current flowing through the phase A winding has reached its peak level (i.e. the end of the phase A PVL).

The phase A excitation will continue as described above, followed by the phase B excitation, as also described above.

Figure 7:
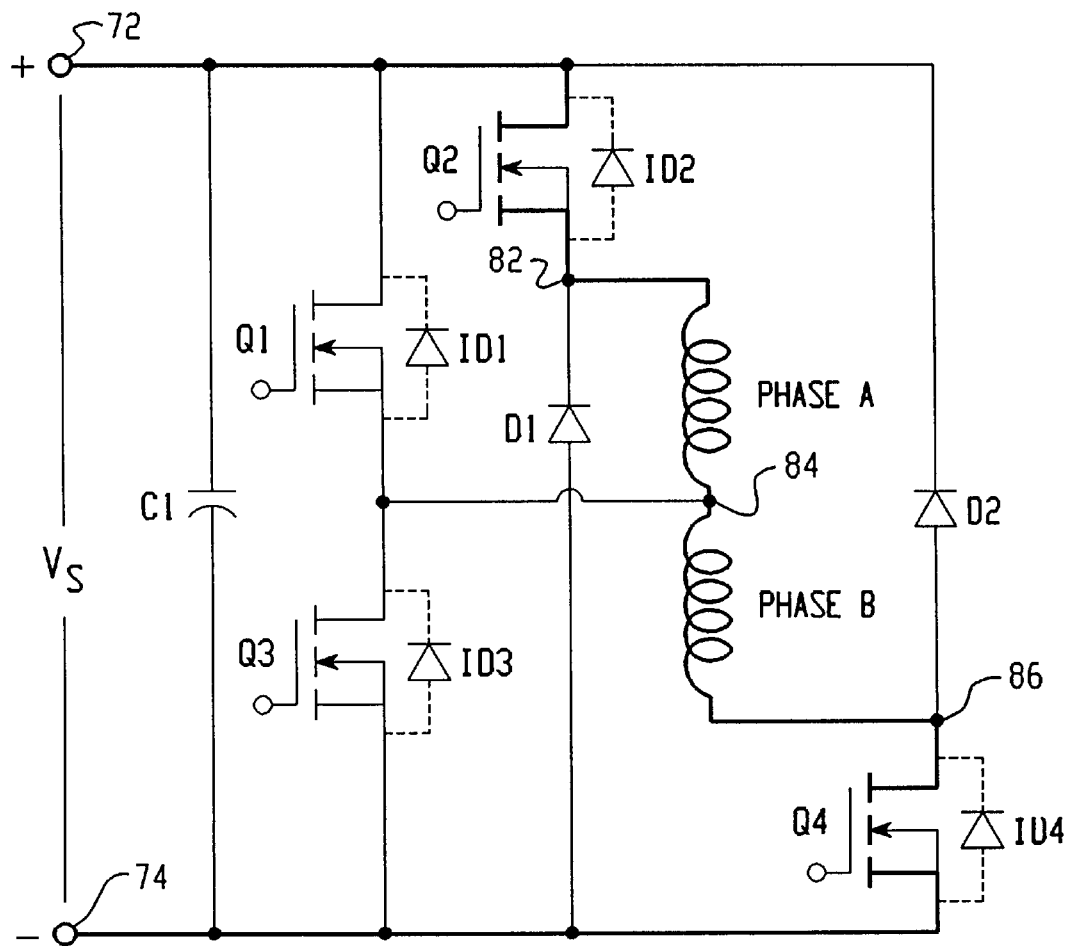
FIG. 7 shows the current flow in the driving circuit of FIG. 4, during a transition mode of operation, according to an alternative embodiment of the present invention.

According to an alternative embodiment of the present invention, a transition mode is used in the period between the ending of a first phase excitation, and the beginning of a subsequent phase excitation. Referring now to FIG. 7, the transition mode will be described in detail. Prior to the transition mode between phase A and phase B, switch Q3 will be turned ON, and switch Q2 will be toggled between ON and OFF (chopping), as the circuit alternates between a ZVL (FIG. 5B) and PVL (FIG. 5A) to regulate the current. To begin the transition mode, switch Q3 is turned OFF, switches Q2 and Q4 are turned ON, and switch Q1 remains OFF. As a result, current simultaneously flows through both phase A and phase B windings, as illustrated in FIG. 7. However, the current flow in the phase A winding is decreasing while the current flow in the phase winding B is increasing. During the transition mode, the current in the phase A winding will decrease to a current level approximately one-half the peak current level, while the phase B winding will increase to a current level approximately one-half the peak current level. The current flow loop during the transition mode is as follows: phase A winding phase B winding—switch Q4—supply voltage Vs—switch Q2.

In order for the current flowing through the phase A winding to reduce to zero, the circuit must change to a PVL for phase B (FIG. 6A). Thus, switches Q1 and Q4 are ON, while switches Q2 and Q3 are OFF. When the phase B PVL is initiated, the phase A winding is in a NVL (i.e., "phase A NVL"), as illustrated by the dashed lines in FIG. 6A (it should be noted that there is no FIG. 5C NVL in this alternative embodiment). The current flowing through the phase A winding will continue to reduce to zero. It should be appreciated that the current flowing through the phase A winding may reduce to zero before, concurrent with, or after, the current flowing through the phase B winding has reached its peak level (i.e. the end of the phase B PVL).

In a similar manner, prior to the transition mode between phase B and phase A, switch Q4 will be turned ON, and switch Q1 will be toggled between ON and OFF (chopping), as the circuit alternates between a ZVL (FIG. 6B) and PVL (FIG. 6A) to regulate the current. To begin the transition mode, switch Q1 in turned OFF, switches Q2 and Q4 are turned ON, and switch Q3 remains OFF. As a result, current simultaneously flows through both phase A and phase B windings, as illustrated in FIG. 7. However, the current flow in the phase B winding is decreasing while the current flow in the phase winding A is increasing. During the transition mode, the current in the phase B winding will decrease to a current level approximately one-half the peak current level, while the phase A winding will increase to a current level approximately one-half the peak current level. The current flow loop during the transition mode is as follows: phase A winding phase B winding—switch Q4—supply voltage Vs—switch Q2.

In order for the current flowing through the phase B winding to reduce to zero, the circuit must change to a PVL for phase A (FIG. 5A). Thus, switches Q2 and Q3 are ON, while switches Q1 and Q4 are OFF. When the phase A PVL is initiated, the phase B winding is in a NVL (i.e., "phase B NVL"), as illustrated by the dashed lines in FIG. 5A (it should be noted that there is no FIG. 6C NVL in this alternative embodiment). The current flowing through the phase B winding will continue to reduce to zero. It should be appreciated that the current flowing through the phase B winding may reduce to zero before, concurrent with, or after, the current flowing through the phase A winding has reached its peak level (i.e. the end of the phase A PVL).

Figure 8A:
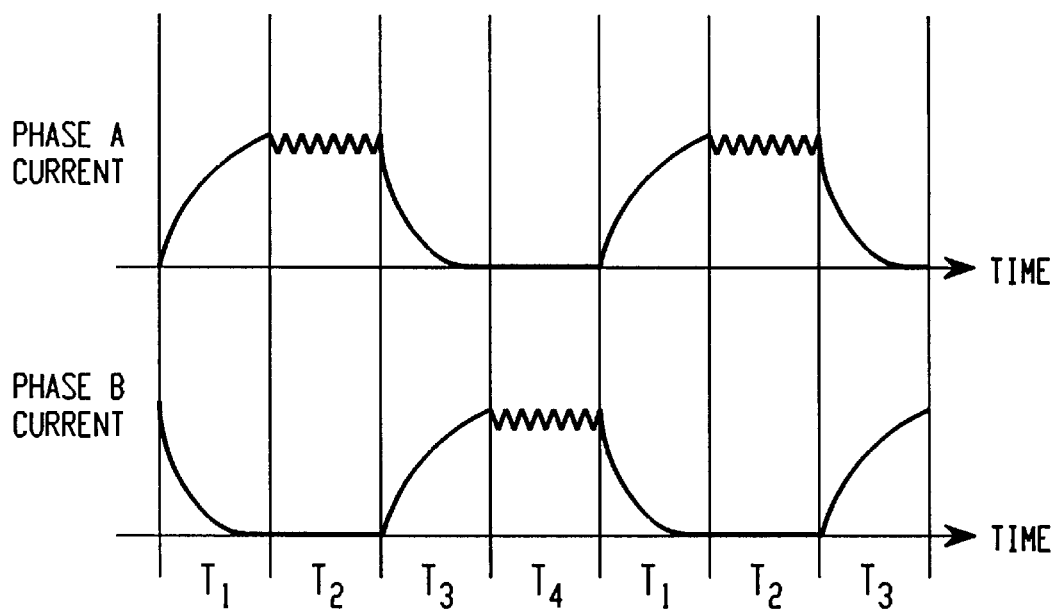
FIG. 8A is a current waveform diagram showing the current in phase windings A and B as a function of time, for the driving circuit of FIG. 4 in a standard operating sequence.

Referring now to FIG. 8A, current waveforms for phase A and phase B are shown for the embodiment of driving circuit having a standard operating sequence (i.e., no transition mode). It should be understood that the waveforms are shown solely for the purpose of illustrating the general waveform shape and sequence, and are not shown to scale.

During period $T_1$ phases A and B are overlapped. In this regard, the phase A winding is in the PVL mode, while the phase B winding is in the NVL mode (FIG. 5A). Thus, the current in the phase A winding is increasing, while the current in the phase B windings is decreasing. In this regard, current in the phase A winding flows in the loop: phase A winding—switch Q3—supply voltage Vs—switch Q2. Simultaneously, current in the phase B winding flows in the loop: phase B winding—diode D2—supply voltage Vs—switch Q3. When the current through phase A has reached a maximum current level, period $T_2$ will begin.

As indicated above, the current flowing through the phase B winding may reduce to zero before, concurrent with, or after, the current flowing through the phase A winding has reached its peak level. In FIG. 8A, the current in the phase B winding reaches zero before the current in the phase A winding has reached its peak.

During period $T_2$ the phase A winding toggles between ZVL and PVL modes, while the phase B winding remains inactive. Following period $T_2$, the operation continues to period $T_3$.

During period $T_3$ the phase A and B are overlapped. In this regard, phase A winding is in the NVL mode, while the phase B winding is simultaneously in the PVL mode (FIG. 6A). Thus, the current in the phase A winding is decreasing, while the current in the phase B windings is increasing. In this regard, current in the phase A winding flows in the loop: phase A winding—switch Q1—supply voltage Vs—diode D1. Simultaneously, current in the phase B winding flows in the loop: phase B winding—switch Q4—supply voltage Vs—switch Q1. When the current through phase B has reached a maximum current level, period $T_4$ will begin.

As indicated above, the current flowing through the phase A winding may reduce to zero before, concurrent with, or after, the current flowing through the phase B winding has reached its peak level. In FIG. 5A, the current in the phase A winding reaches zero before the current in the phase B winding has reached its peak.

During period $T_4$ the phase B winding toggles between ZVL and PVL modes, while the phase A winding remains inactive. Following period $T_4$, the operation returns to period $T_1$.

Figure 8B:
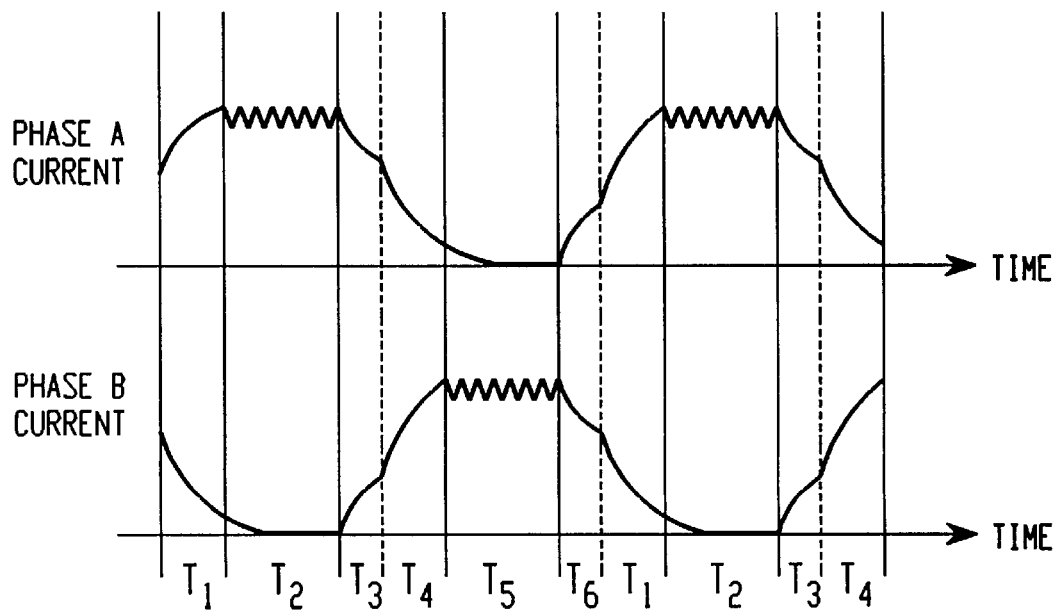
FIG. 8B is a current waveform diagram showing the current in phase windings A and B as a function of time, for the driving circuit of FIG. 4 in an operating sequence including a transition mode.

As indicated above, in an alternative embodiment of the present invention, a transition mode is used. Referring now to FIG. 8B, current waveforms for phase A and phase B are shown for the embodiment of driving circuit having a modified operating sequence (i.e., includes a transition mode). It should be understood that the waveforms are shown solely for the purpose of illustrating the general waveform shape and sequence, and are not shown to scale.

During period $T_1$, phase A winding is in a PVL, while phase B winding is in a NVL (FIG. 5A). As indicated above, the current flowing through the phase B winding may reduce to zero before, concurrent with, or after, the current flowing through the phase A winding has reached its peak level. In FIG. 8B, the current in the phase B winding reaches zero after the current in the phase A winding has reached its peak.

During period $T_2$, the current in the phase A winding is maintained, while the current in the phase B winding is reduced to zero.

Period $T_3$ is the transition mode (FIG. 7), wherein the current in the phase A winding is decreasing (NVL), while the current in the phase B winding is increasing (PVL). During period $T_4$, the phase A winding is in a NVL, while the phase B winding is in a PVL (FIG. 6A). As indicated above, the current flowing through the phase A winding may reduce to zero before, concurrent with, or after, the current flowing through the phase B winding has reached its peak level. In FIG. 8B, the current in the phase A winding reaches zero after the current in the phase B winding has reached its peak.

During period $T_5$, the current in the phase B winding is maintained, while the current in phase A winding is reduced to zero. Period $T_6$ is another transition mode, wherein the current in the phase B winding is decreasing (NVL), while the current in the phase A winding is increasing (PVL).

Figure 9:
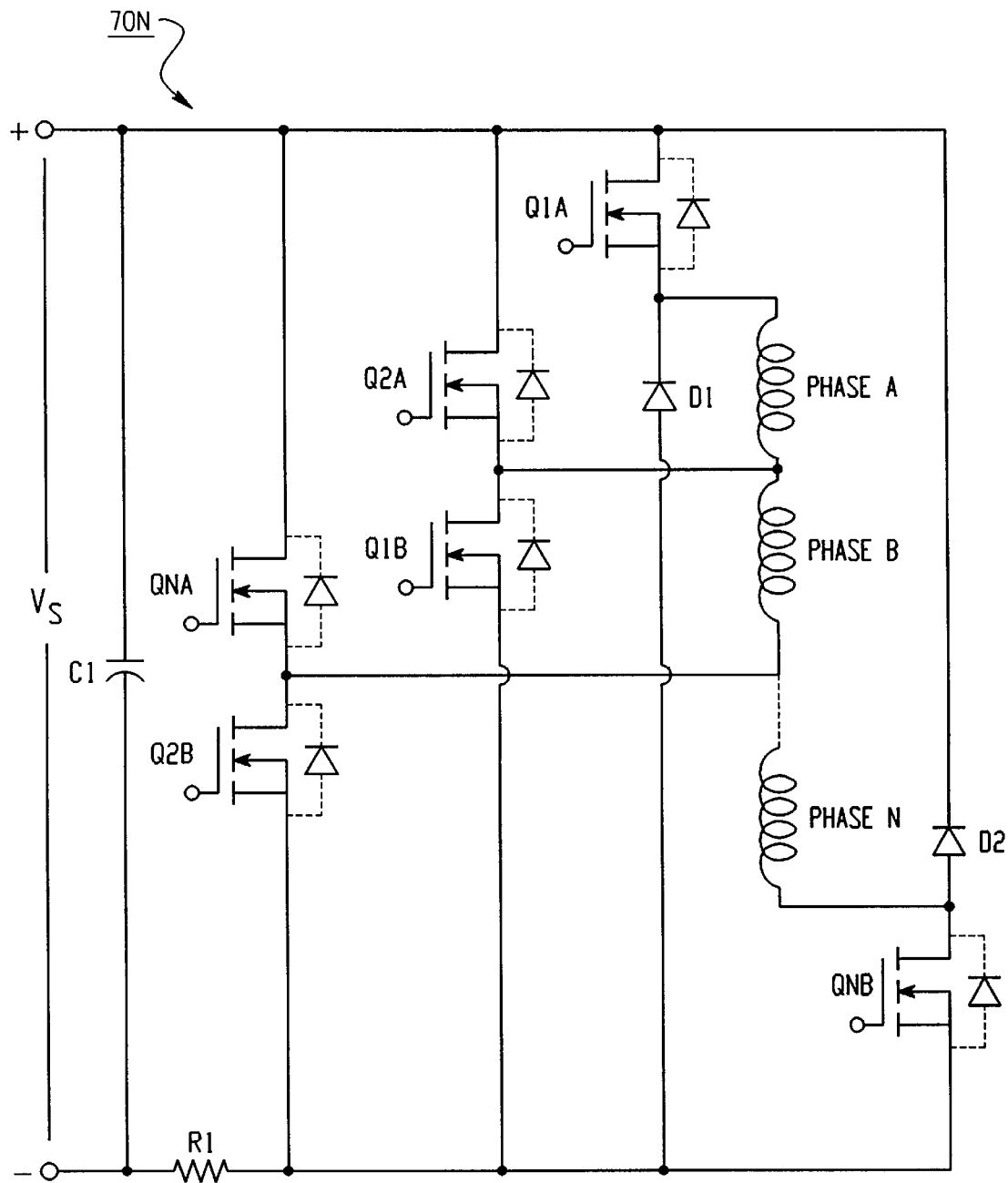
FIG. 9 shows a driving circuit for an SR motor having N phase windings, according to a preferred embodiment of the present invention.

Referring now to FIG. 9, there is shown a schematic illustrating the driving circuit of the present invention as configured for use with an SR machine having N phases, where N is greater than 2. It should be appreciated that the total switch count becomes 2N, where N is the number of phases, while the total number of individual diodes remains at two (i.e., diodes D1 and D2). Moreover, the number of machine lead connections remains at N+1. A pair of switches is associated with each phase winding. In this respect, the first switch is connected between the positive terminal of the DC supply voltage potential and a first terminal of the phase winding, while the second switch is connected between the negative terminal of the DC supply voltage potential and a second terminal of the phase winding.

The operation of driving circuit 70N for N phase windings is similar to the operation of driving circuit 70 for two phase windings. In this regard, switches Q1A and Q1B are turned ON and OFF in the manner discussed above to control the flow of current through the phase 1 winding. In particular, switches Q1A and Q1B are turned ON during a PVL. During a ZVL, switch Q1A is turned OFF, switch Q1B is turned ON, and diode D1 is forward biased. Switch Q1A may be toggled ON and OFF, while switch Q1B is ON, in order to regulate the current through the phase winding. During a NVL, switches Q1A and Q1B are turned OFF, while diode D1 and the intrinsic diode of switch Q2A are forward biased.

Similarly, switches Q2A and Q2B are turned ON and OFF in the manner discussed above to control the flow of current through the phase 2 winding. In particular, switches Q2A and Q2B are turned ON during a PVL. During a ZVL, switch Q2A is turned OFF, switch Q2B is turned ON, and the intrinsic diode of switch Q1B is forward biased. Switch Q2A may be toggled ON and OFF, while switch Q2B is ON, in order to regulate the current through the phase winding. During a NVL, switches Q1A and Q1B are turned OFF, and the intrinsic diodes of switches Q1B and QNA are forward biased.

For the phase N winding, switches QNA and QNB are likewise turned ON and OFF to control current flow through the phase N winding. In particular, switches QNA and QNB are turned ON during a PVL. During a ZVL, switch QNA is turned OFF, switch QNB is turned ON, and the intrinsic diode of switch Q2B is forward biased. Switch QNA may be toggled ON and OFF, while switch QNB is ON, in order to regulate the current through the phase winding. During a NVL, switches QNA and QNB are turned OFF, and the intrinsic diode of switch Q2B and diode D2 are forward biased.

When driving circuit 70N is used in the transition mode described above, the first switch associated with the phase winding whose excitation period is ending and the second switch associated with the phase winding whose excitation period is beginning are turned ON, while the remaining switches of the driving circuit are turned OFF. As a result, current flow decreases in the phase winding that is ending its excitation period and current flow increases in the phase winding that is beginning its excitation period. For example, where N=3, switches Q2A and QNB will be turned ON during the transition mode from phase 2 to phase N. Likewise, switches Q1A and Q2B will be turned ON during the transition mode from phase 1 to phase 2.

As can be observed from FIG. 9, a pair of switches is added to the driving circuit for each additional phase winding. Accordingly, the driving circuit of the present invention may be configured for use in connection with SR machines having a large number of phases.

Figure 2:
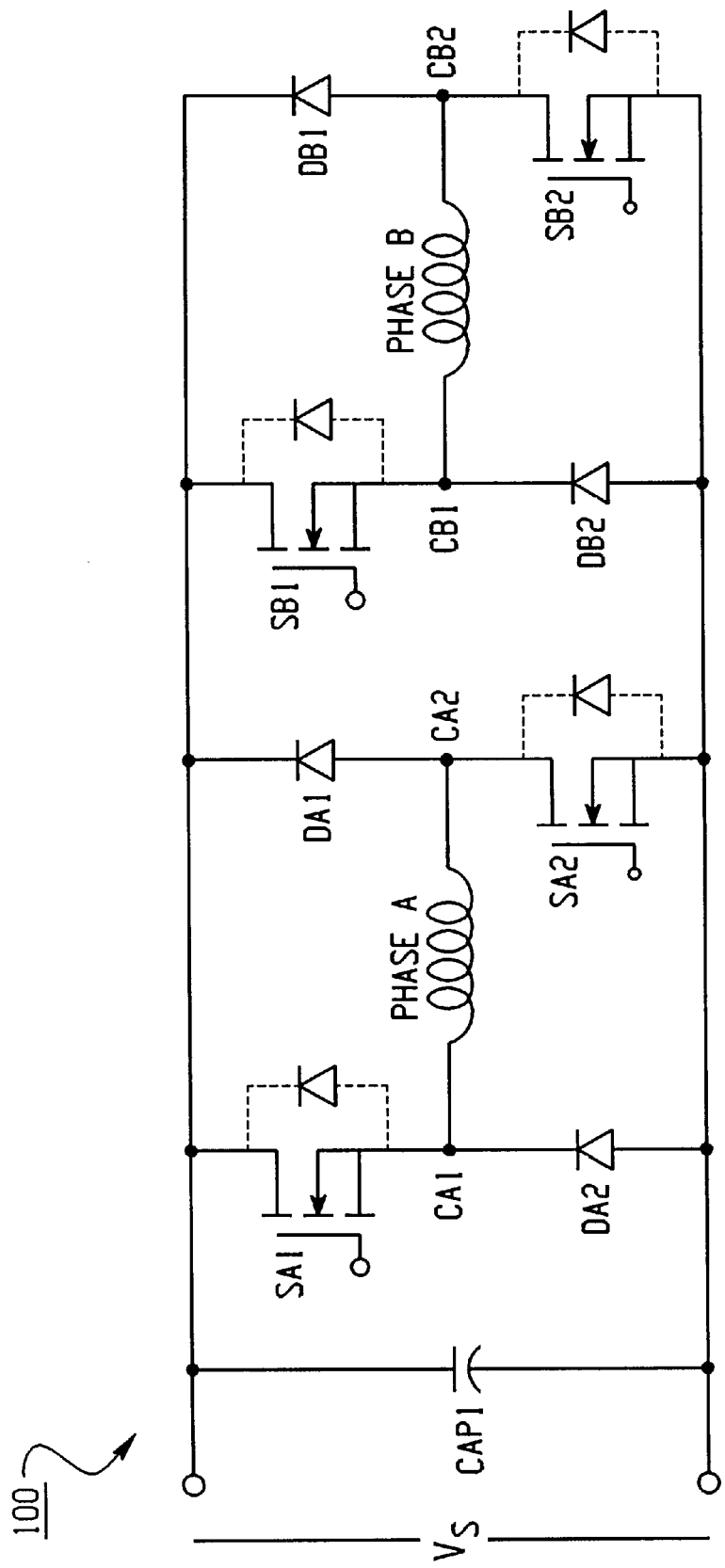
FIG. 2 is a schematic of a first prior art driving circuit.
Figure 3:
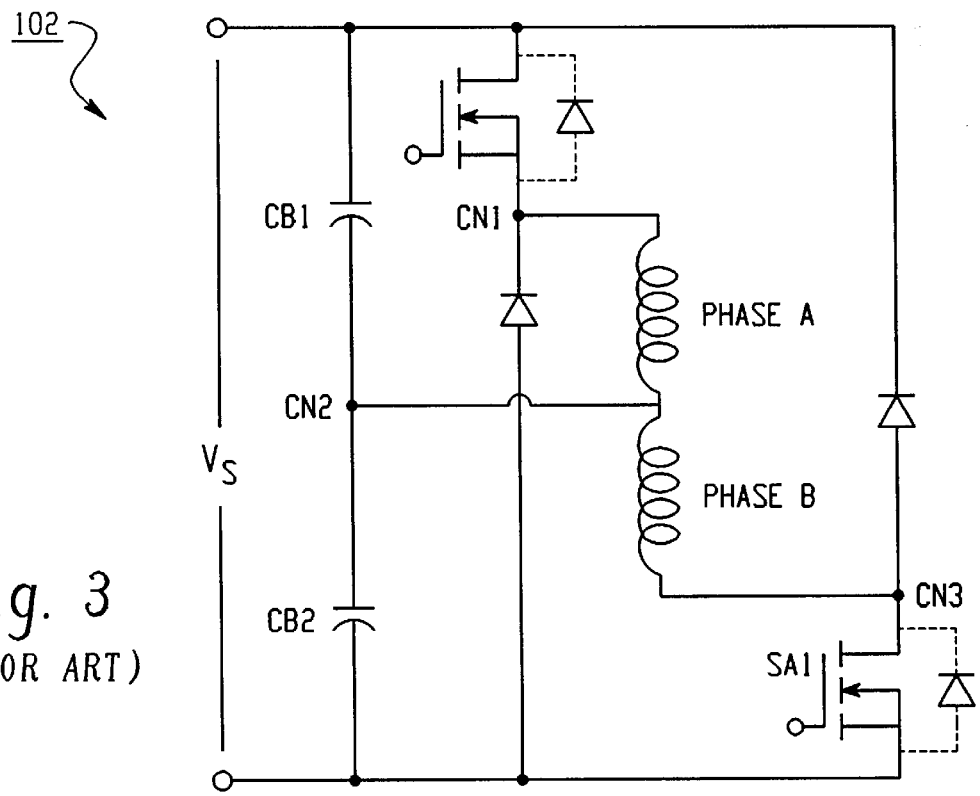
FIG. 3 is a schematic of a second prior art driving circuit.
Figure 10:
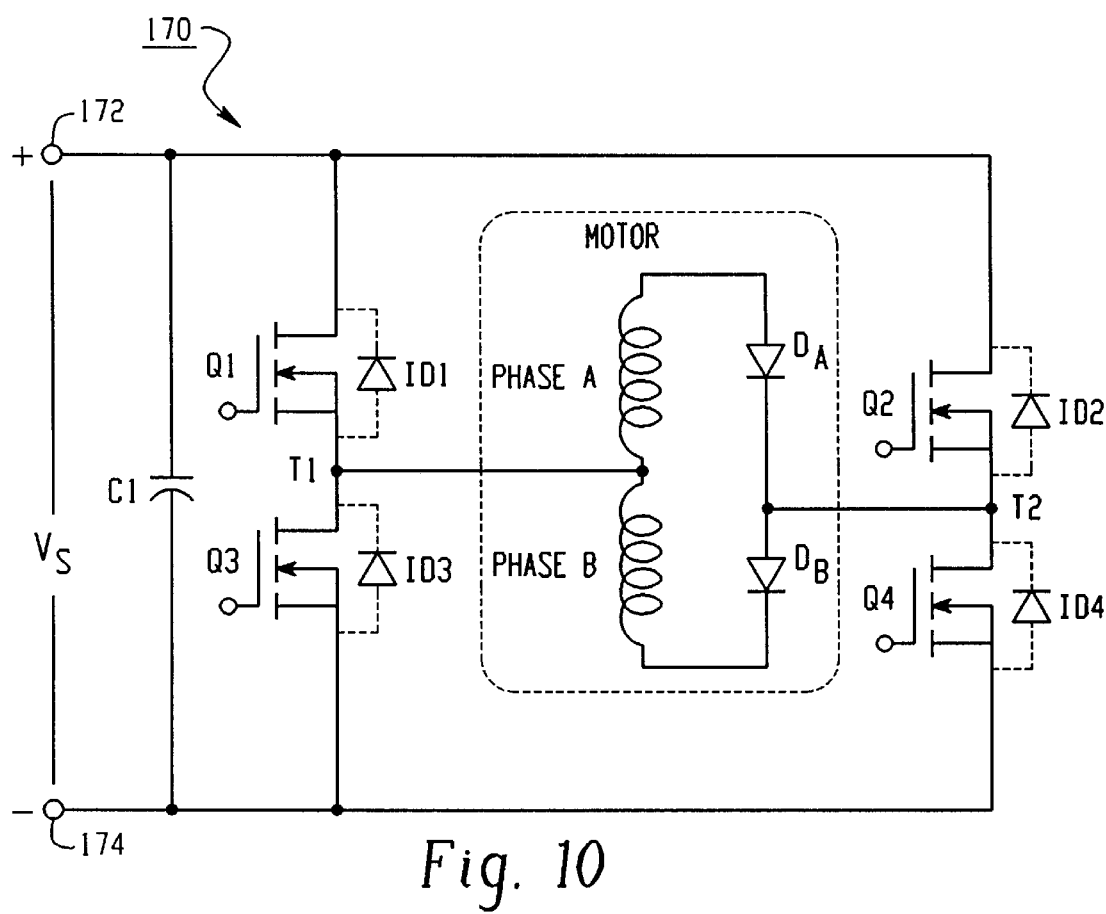
FIG. 10 is an SR motor driving circuit requiring only two power wires, according to another embodiment of the present invention.

FIG. 10 illustrates yet another embodiment of the present invention. Driver circuit 170 is adapted to drive a 2-phase SR motor, using only two power wires. As noted above, a typical driving scheme used to energize an SR machine is the independent half bridge output stage (FIG. 2). One important drawback to this driving scheme, as well as other prior art driving schemes, is the need for two connections per phase for power leads. Moreover, they lack the ability to use standard full bridge output modules designed for PM brushless motors.

The two power wires are connected at terminals T1 and T2. Essentially, driver circuit 170 uses a standard full bridge output module, with 2 diodes $D_A$ and $D_B$ embedded in the machine (e.g., motor). Accordingly, in a preferred embodiment of the present invention, driver circuit 170 is generally comprised of switching means Q1–Q4 (with associated intrinsic diodes ID1–ID4), and diodes $D_A$ and $D_B$. Diodes $D_A$ and $D_B$ are located local to the motor.

Figure 11A:
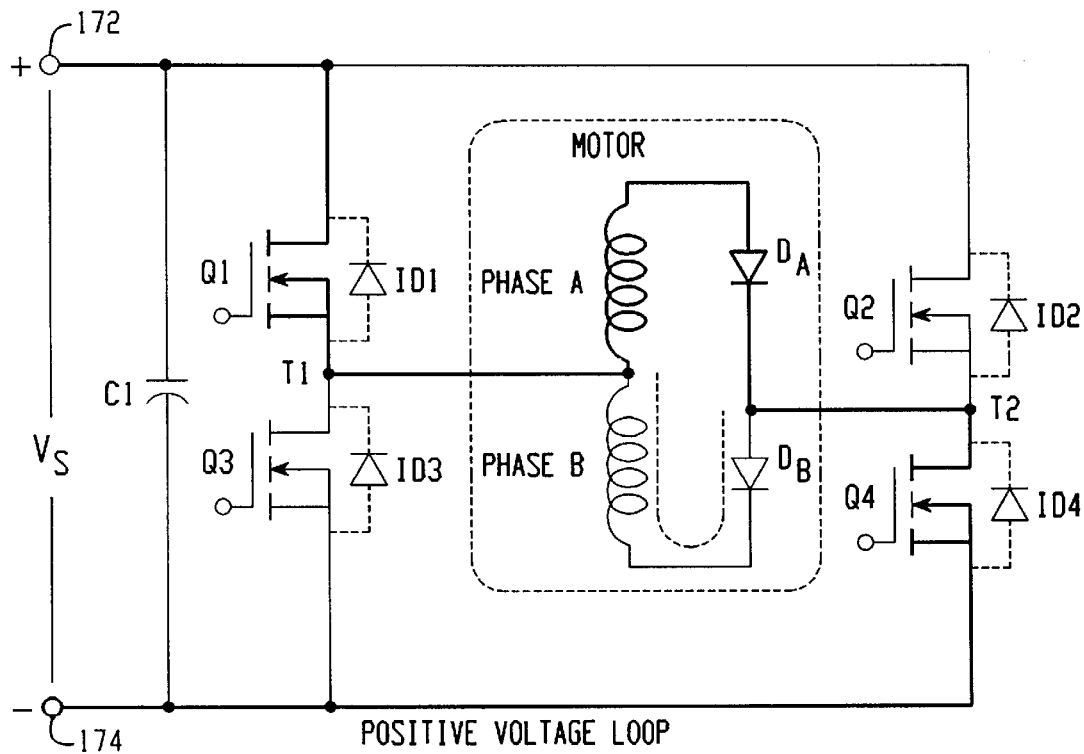
FIGS. 11A–11C show current flow in the driving circuit of FIG. 10, in various modes of operation during excitation of the phase A windings.
Figure 11B:
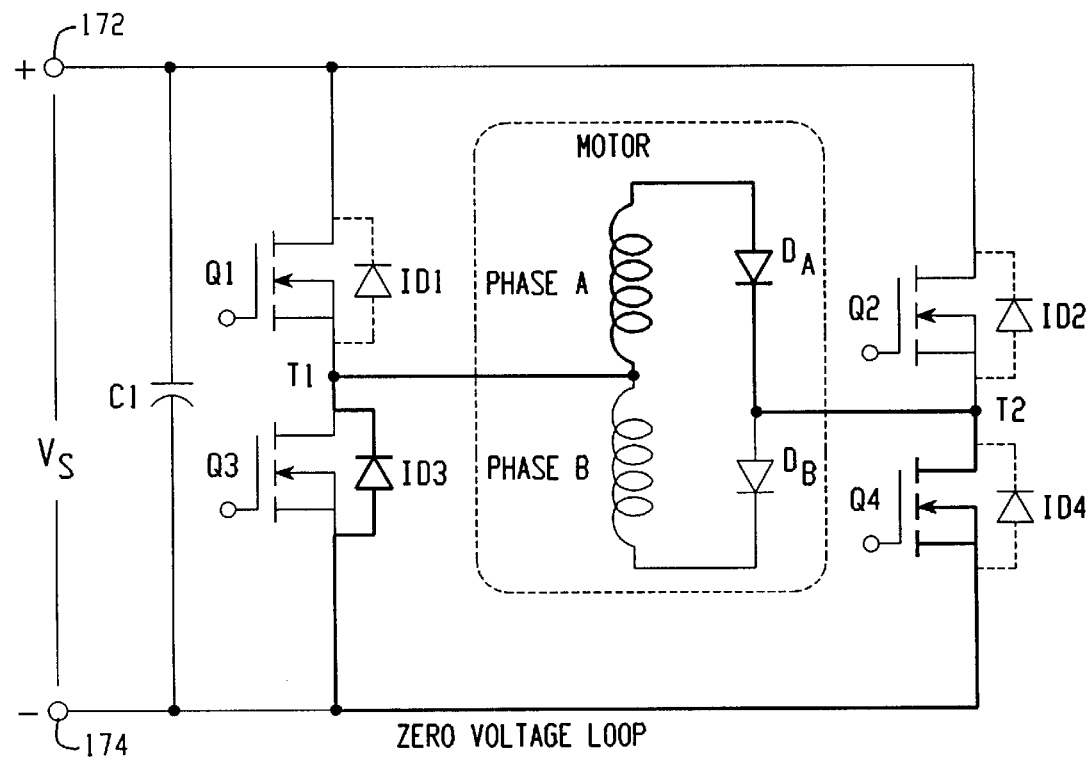
Figure 11C:
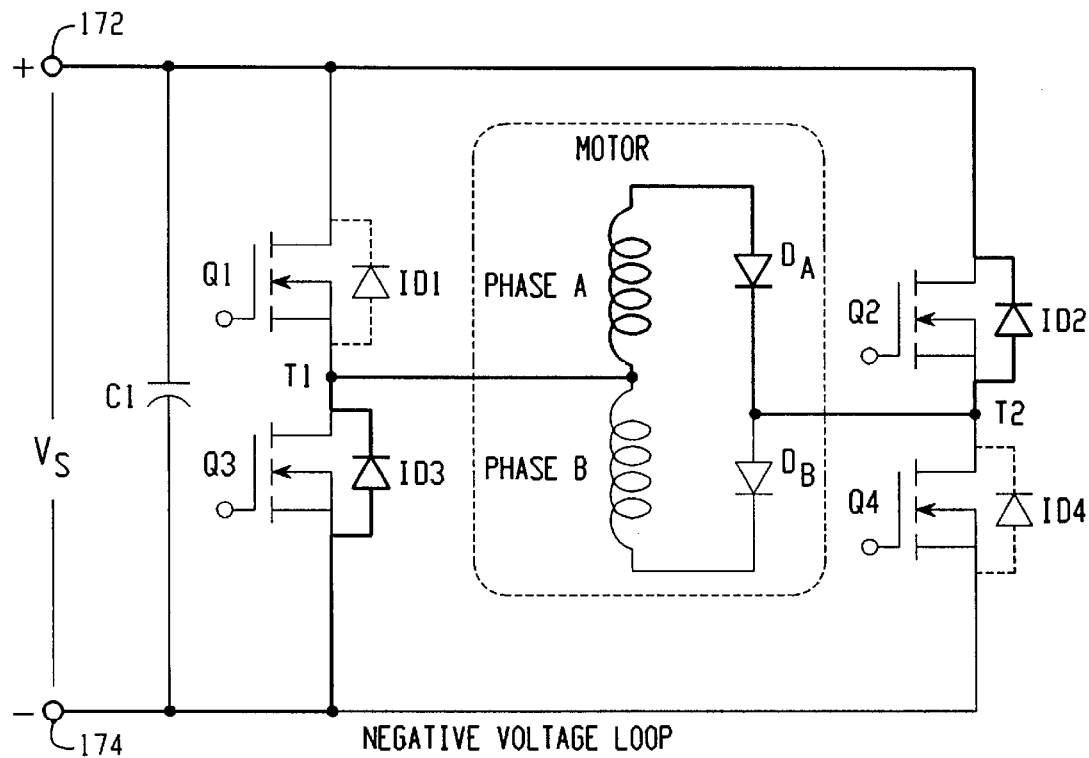
Figure 12A:
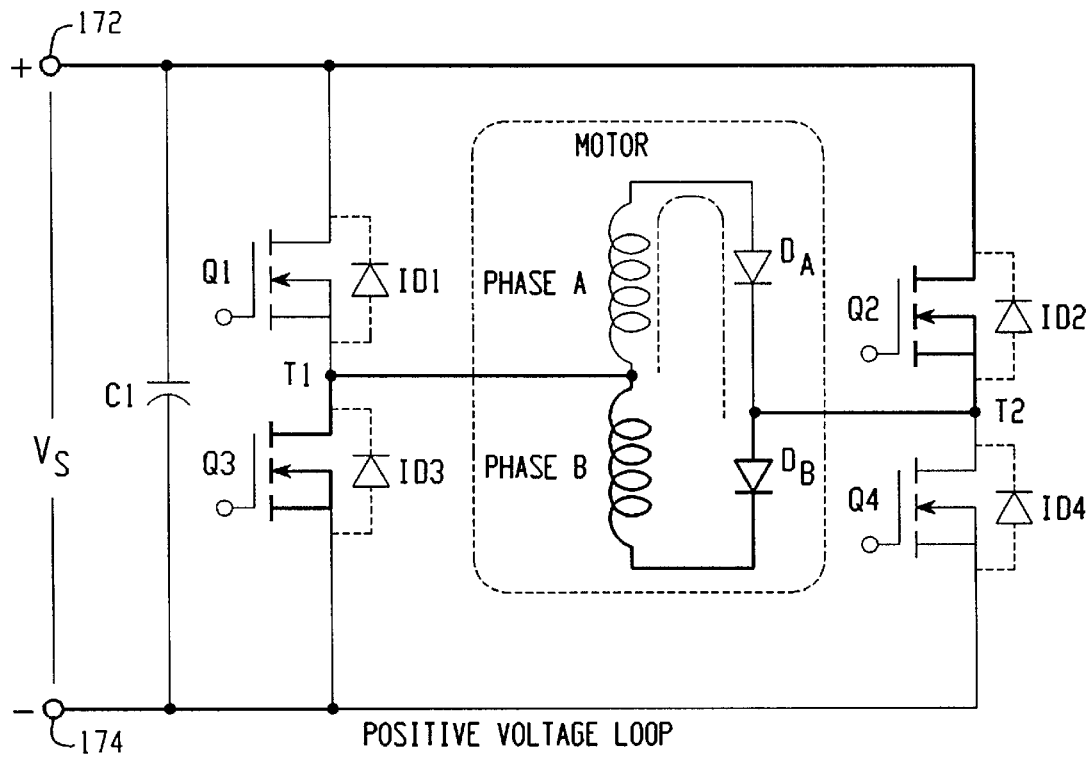
FIGS. 12A–12C show current flow in the driving circuit of FIG. 10, in various modes of operation during excitation of the phase B windings.
Figure 12B:
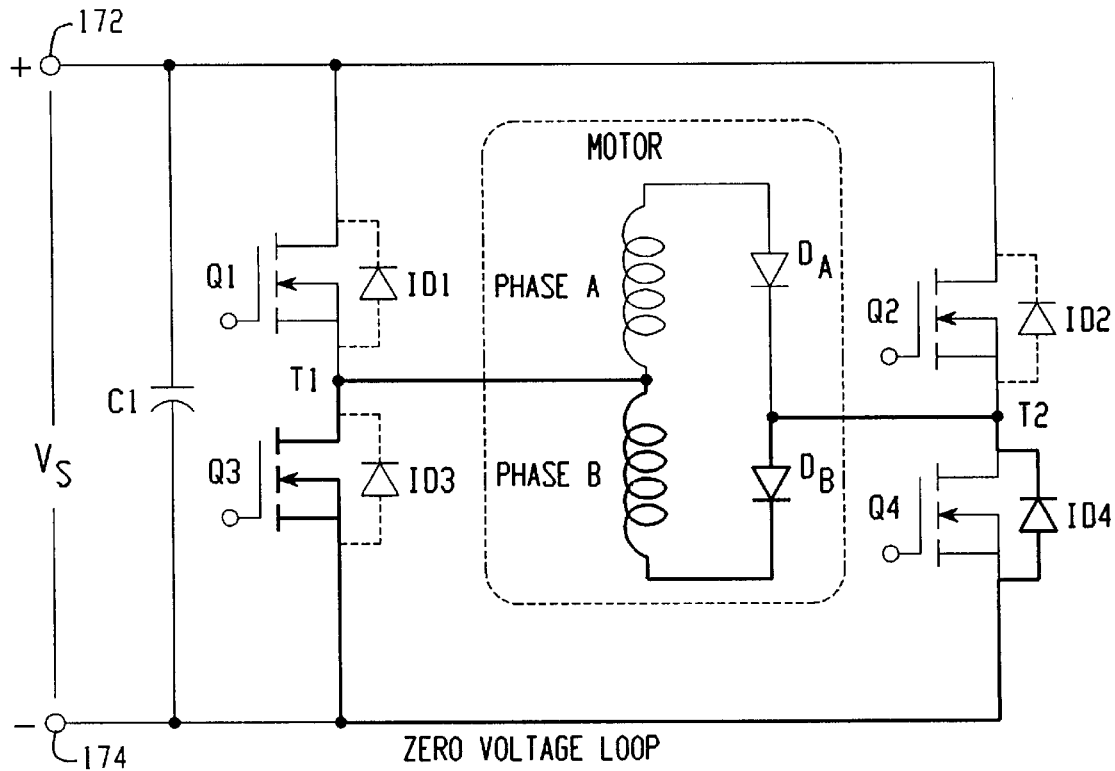
Figure 12C:
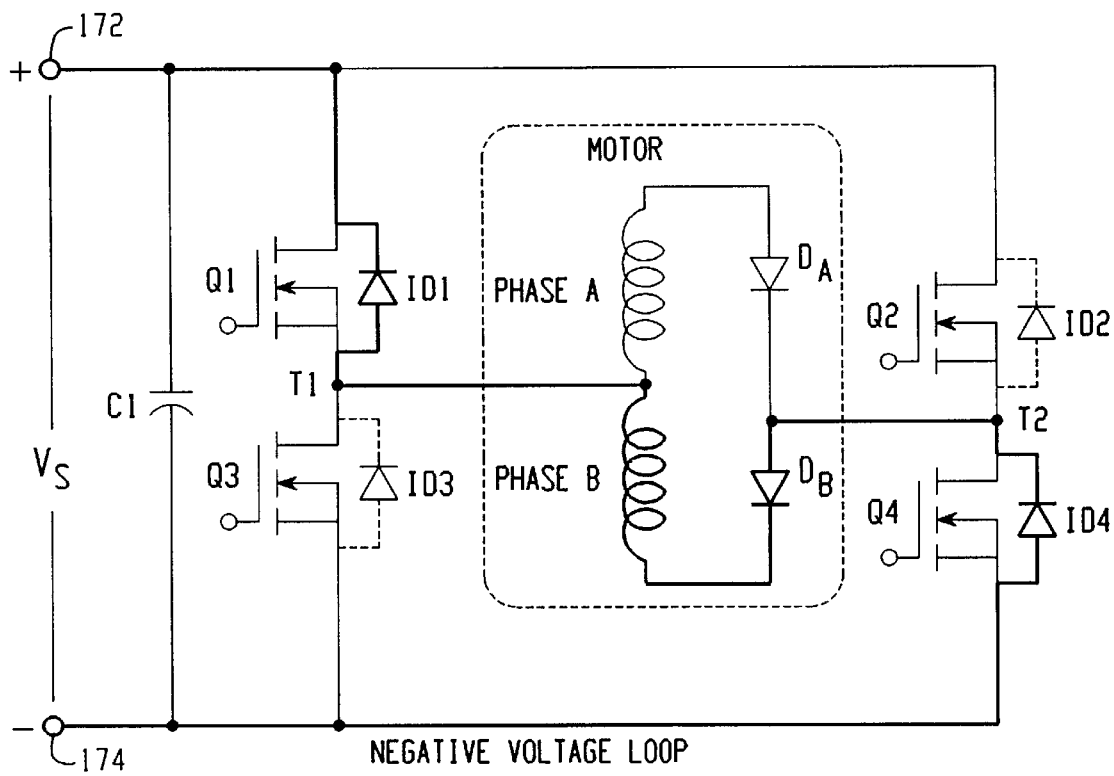

Operation of driving circuit 170 will now be described in detail with reference to FIGS. 11A–11C and 12A–12C. FIGS. 11A–11C illustrate circuit operation during the excitation period for phase A, while FIGS. 12A–12C illustrate circuit operation during the excitation period for phase B.

To begin phase A excitation, switches Q1 and Q4 are switched ON. As a result, the positive terminal 72 of DC supply voltage Vs is connected to terminal T1, and the negative terminal 174 of supply voltage Vs is connected to terminal T2. Diode $D_A$ is forward biased, while diode $D_B$ is reverse biased. Accordingly, supply voltage Vs is applied to the inductors comprising phase winding A in a positive voltage loop (PVL). This results in a steady increase in the phase A current. Current flows in the following loop (FIG. 11A): phase winding A—diode DA—switch Q4—supply voltage Vs—switch Q1.

When the peak current level is reached, switch Q1 is turned OFF, while switch Q4 remains ON. As a result, intrinsic diode ID3 of switch Q3 becomes forward biased. Accordingly, terminal T1 is connected to negative terminal 174 through intrinsic diode ID3. Since switch Q4 remains ON, terminal T2 is also connected to negative terminal 174. Therefore, the inductors comprising phase winding A are short circuited in a zero voltage loop (ZVL). The current flows in the following loop (FIG. 11B): phase winding A—diode DA—switch Q4—intrinsic diode ID3.

The phase A current will slowly decay. To maintain the current in phase winding A for the desired duration, switch Q1 is toggled between ON and OFF (i.e., chopping). When switch Q1 is ON, the circuit returns to the PVL mode, whereas, when switch Q1 is OFF, the circuit returns to the ZVL mode.

When it is the appropriate time to decrease the phase A current to zero, switches Q1 and Q4 are both turned OFF. As a result, intrinsic diode ID2 of switch Q2 and intrinsic diode ID3 of switch Q3 become forward biased. As a result, a negative supply voltage Vs is applied to the windings of phase A. The current flows in a NVL as follows (FIG. 11C): phase winding A—diode $D_A$—intrinsic diode ID2—supply voltage Vs—intrinsic diode ID3.

To begin the subsequent excitation of the phase B winding, switches Q2 and Q3 are turned ON. Therefore, current flows in a PVL as follows (FIG. 12A): phase winding B—switch Q3—supply voltage Vs—switch Q2—diode $D_B$. Consequently, the current in the inductors comprising phase winding B will steadily increase.

When the peak current level is reached, switch Q2 is turned OFF. As a result, intrinsic diode ID4 of switch Q4 becomes forward biased. Therefore, current flows in a ZVL as follows (FIG. 12B): phase winding B—switch Q3—intrinsic diode ID4—diode $D_B$. This results in a gradual decay in the phase B current. To maintain the current for the desired duration, switch Q2 is toggled between ON and OFF (i.e., chopped). When switch Q2 is ON, the circuit is in the PVL mode, and when switch Q2 is OFF, the circuit is in the ZVL mode.

When it is the appropriate time to decrease the phase B current to zero, switches Q1 and Q4 are both turned OFF. As a result, intrinsic diode ID1 of switch Q1 and intrinsic diode ID4 of switch Q4 become forward biased. As a result, a negative supply voltage Vs is applied to the windings of phase B. The current flows in a NVL as follows (FIG. 12C): phase winding B—intrinsic diode ID1—supply voltage Vs—intrinsic diode ID4—diode $D_B$. The foregoing cycle repeats itself again with the excitation of phase A, as described above.

Notably, driver circuit 170 allows decaying current from a phase just turned OFF to be routed to the other phase, just turned ON, internal to the motor. This reduces the losses associated with the current normally exiting the motor and being rerouted back from the driver circuit. The freewheeling current from one phase gets shunted to the opposite phase, thus reducing the current that the power leads and driver circuit need to manage. The energized phase is determined by the polarity of the voltage across the two power leads. With reference to FIGS. 11A–11C and 12A–12C, it should be understood that the phase B PVL will initially overlap with the end of the phase A NVL. In this respect, the current flowing through the phase A winding will be decreasing as the current flowing through the phase B winding is increasing. The simultaneous current flow through phase A winding is shown by the dashed lines in FIG. 12A. Likewise, the phase B NVL will also initially overlap with the end of the phase A PVL. Thus, the current flowing through the phase B winding will be decreasing as the current flowing through the phase A winding is increasing. The simultaneous current flow through phase B winding is shown by the dashed lines in FIG. 11A. It should be noted that the waveform for circuit 170 will be similar to the waveform shown in FIG. 8A.

It will be appreciated that an SR machine having an even multiple of phases can be driven by using one driver circuit 170 for every two phases. For instance, a four phase SR machine requires two driver circuits 170, wherein the first driver circuit is for phases 1 and 2, and the second driver circuit is for phases 3 and 4.

The invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A driving circuit for controlling the flow of current in a switched reluctance (SR) machine, comprising:

first and second phase windings each having first and second terminals with the first terminal of the phase windings being connected together at a common node;

first switch means having a first electrode for connection to a first DC potential, a second electrode for connection to the common node, and a control electrode for controlling the turning on and off of the first switch means;

second switch means having a first electrode for connection to the first DC potential, a second electrode for connection to the second terminal of the first phase winding and a control electrode for controlling the turning on and off of the second switch means;

third switch means having a first electrode for connection to the common node, a second electrode connected to a second DC potential, and a control electrode for controlling the turning on and off of the third switch means;

fourth switch means having a first electrode for connection to the second terminal of the second phase winding, a second electrode for connection to the second DC potential, and a control electrode for controlling the turning on and off of the fourth switch means;

a first diode having a first terminal for connection to the second DC potential, and a second terminal for connection to the second terminal of the first phase winding; and a second diode having a first terminal for connection to the second terminal of the second phase winding, and a second terminal for connection to the first DC potential.

2. A driving circuit according to claim 1, wherein said first, second, third, and fourth switch means are solid state switching devices having intrinsic diodes.

3. A driving circuit according to claim 2, wherein said solid state switching devices are MOSFETS.

4. A driving circuit according to claim 1, wherein said driving circuit further comprises a capacitor having a first terminal for connection with the first DC potential, and a second terminal for connection with the second DC potential.

5. A driving circuit according to claim 1, wherein said first DC potential is greater than the second DC potential.

6. A driving circuit according to claim 1, wherein said first terminals of said first and second diodes is an anode, and the second terminals of the first and second diodes is a cathode.

7. A method for controlling flow of current in a switched reluctance (SR) machine comprising first and second phase windings having first and second terminals with the first terminal of the phase windings being connected together at a common node; first switch means having a first electrode for connection to a first DC potential, a second electrode for connection to the common node, and a control electrode for controlling the turning on and off of the first switch means; second switch means having a first electrode for connection to the first DC potential, a second electrode for connection to the second terminal of the first phase winding and a control electrode for controlling the turning on and off of the second switch means; third switch means having a first electrode for connection to the common node, a second electrode connected to a second DC potential, and a control electrode for controlling the turning on and off of the third switch means; fourth switch means having a first electrode for connection to the second terminal of the second phase winding, a second electrode for connection to the second DC potential, and a control electrode for controlling the turning on and off of the fourth switch means; a first diode having a first terminal for connection to the second DC potential, and a second terminal for connection to the second terminal of the first phase winding; and a second diode having a first terminal for connection to the second terminal of the second phase winding, and a second terminal for connection to the first DC potential, comprising the steps in sequence in time:

turning ON the second and third switch means;

toggling ON and OFF one of the second switch means and the third switch means;

turning OFF the second and third switch means;

turning ON the first and fourth switch means;

toggling ON and OFF one of the first switch means and the fourth switch means; and turning OFF the first and fourth switch means.

8. A method according to claim 7, wherein current flows through an intrinsic diode of said first switch means following the step of turning OFF the second and third switch means.

9. A method according to claim 7, wherein current flows through an intrinsic diode of said third switch means when first switch means is turned OFF during the step of toggling ON and OFF one of the first switch means and the fourth switch means.

10. A method according to claim 7, wherein current flows through an intrinsic diode of said third switch means following the step of turning OFF the first and fourth switch means.

11. A method for controlling flow of current in a switched reluctance (SR) machine comprising first and second phase windings having first and second terminals with the first terminal of the phase windings being connected together at a common node; first switch means having a first electrode for connection to a first DC potential, a second electrode for connection to the common node, and a control electrode for controlling the turning on and off of the first switch means; second switch means having a first electrode for connection to the first DC potential, a second electrode for connection to the second terminal of the first phase winding and a control electrode for controlling the turning on and off of the second switch means; third switch means having a first electrode for connection to the common node, a second electrode connected to a second DC potential, and a control electrode for controlling the turning on and off of the third switch means; fourth switch means having a first electrode for connection to the second terminal of the second phase winding, a second electrode for connection to the second DC potential, and a control electrode for controlling the turning on and off of the fourth switch means; a first diode having a first terminal for connection to the second DC potential, and a second terminal for connection to the second terminal of the first phase winding; and a second diode having a first terminal for connection to the second terminal of the second phase winding, and a second terminal for connection to the first DC potential, comprising the steps in sequence in time:

turning ON the second and third switch means;

toggling ON and OFF one of the second switch means and the third switch means;

turning OFF the third switch means;

turning ON the second and fourth switch means;

turning OFF the second switch means;

turning ON the first switch means;

toggling ON and OFF one of the first switch means and the fourth switch means;

turning ON the second and fourth switch means; and turning OFF the fourth switch means.

12. A driving circuit for controlling the flow of current in a switched reluctance (SR) machine, comprising:

first and second phase windings each having first and second terminals with the first terminal of the phase windings being connected together at a first common node;

a first diode having first and second terminals, the first terminal for connection to the second terminal of the first phase winding;

a second diode having first and second terminals, the first terminal of the second diode and the second terminal of the first diode connected together at a second common node, and the second terminal of the second diode connected to the second terminal of the second phase winding;

first switch means having a first electrode for connection to a first DC potential, a second electrode for connection to the first common node, and a control electrode for controlling the turning on and off of the first switch means;

second switch means having a first electrode for connection to the first DC potential, a second electrode for connection to the second common node, and a control electrode for controlling the turning on and off of the second switch means;

third switch means having a first electrode for connection to the first common node, a second electrode connected to a second DC potential, and a control electrode for controlling the turning on and off of the third switch means; and fourth switch means having a first electrode for connection to the second common node, a second electrode for connection to the second DC potential, and a control electrode for controlling the turning on and off of the third switch means.

13. A driving circuit according to claim 12, wherein said first, second, third, and fourth switch means are solid state switching devices having intrinsic diodes.

14. A driving circuit according to claim 13, wherein said solid state switching devices are MOSFETS.

15. A driving circuit according to claim 12, wherein said driving circuit further comprises a capacitor having a first terminal for connection with the first DC potential, and a second terminal for connection with the second DC potential.

16. A driving circuit according to claim 12, wherein said first DC potential is at a greater potential than the second DC potential.

17. A driving circuit according to claim 12, wherein said first terminals of said first and second diodes is an anode, and the second terminals of the first and second diodes is a cathode.

18. A driving circuit according to claim 12, wherein said first and second diodes are embedded in said SR machine, and said first and second common nodes are the sole connections between said driving circuit and said SR machine.

19. A method for controlling flow of current in a switched reluctance (SR) machine comprising first and second phase windings each having first and second terminals with the first terminal of the phase windings being connected together at a first common node; a first diode having first and second terminals, the first terminal for connection to the second terminal of the first phase winding; a second diode having first and second terminals, the first terminal of the second diode and the second terminal of the first diode connected together at a second common node, and the second terminal of the second diode connected to the second terminal of the second phase winding; first switch means having a first electrode for connection to a first DC potential, a second electrode for connection to the first common node, and a control electrode for controlling the turning on and off of the first switch means; second switch means having a first electrode for connection to the first DC potential, a second electrode for connection to the second common node, and a control electrode for controlling the turning on and off of the second switch means; third switch means having a first electrode for connection to the first common node, a second electrode connected to a second DC potential, and a control electrode for controlling the turning on and off of the third switch means; and fourth switch means having a first electrode for connection to the second common node, a second electrode for connection to the second DC potential, and a control electrode for controlling the turning on and off of the third switch means, comprising the steps in sequence in time:

turning ON the first and fourth switch means;

toggling ON and OFF one of the first and fourth switch means;

turning OFF the first and fourth switch means;

turning ON the second and third switch means;

toggling ON and OFF one of the second and third switch means; and turning OFF the second and third switch means.

20. A method according to claim 19, wherein current flows through an intrinsic diode of said third switch means, when only said fourth switch means is turned ON, and current is flowing through said first phase winding.

21. A method according to claim 19, wherein current flows through an intrinsic diode of said second switch means and through an intrinsic diode of said third switch means, following the step of turning OFF the first and fourth switch means.

22. A method according to claim 19, wherein current flows through an intrinsic diode of said fourth switch means, when only said third switch means is turned ON, and current is flowing through said second phase winding.

23. A method according to claim 19, wherein current flows through an intrinsic diode of said fourth switch means and through an intrinsic diode of said first switch means, following the step of turning OFF said second and third switch means.

24. A driving circuit for controlling the flow of current in a switched reluctance (SR) machine having N phase windings, where N is greater than or equal to 2, said driving circuit comprising:

N phase windings each having first and second terminals, wherein said respective second terminal of each of the phase windings, except the Nth phase winding, is connected to the respective first terminal of the next consecutive phase winding;

a plurality of first switch means, each said first switch means including:

a first electrode for connection to a first DC potential, a second electrode for connection to the first terminal of one of said N phase windings, and a control electrode for controlling the turning on and off of the first switch means; and a plurality of second switch means, each said second switch means including:
a first electrode for connection to a second DC potential,
a second electrode for connection to the second terminal of one of said N phase windings, and
a control electrode for controlling the turning on and off of the second switch means.

25. A driving circuit according to claim 24, wherein said driving circuit further comprises:
a first diode having a first terminal for connection to the second DC potential, and a second terminal for connection to the first terminal of a first phase winding of said N phase windings; and
a second diode having a first terminal for connection to the second terminal of a Nth phase winding of said N phase windings, and a second terminal for connection to the first DC potential.

26. A driving circuit according to claim 24, wherein said plurality of first and second switch means are solid state switching devices having intrinsic diodes.

27. A driving circuit according to claim 24, wherein said driving circuit further comprises a capacitor having a first terminal for connection with the first DC potential, and a second terminal for connection with the second DC potential.

28. A driving circuit according to claim 24, wherein said driving circuit further comprises a sense resistor for sensing current flowing through one or more of said N phase windings.

29. A method for controlling flow of current in a switched reluctance (SR) machine having N phase windings, where N is greater than or equal to 2, said driving circuit comprising:
N phase windings each having first and second terminals, wherein said respective second terminal of each of the phase windings, except the Nth phase winding, is connected to the respective first terminal of the next consecutive phase winding;
a plurality of first switch means, each said first switch means having a first electrode for connection to a first DC potential, a second electrode for connection to the first terminal of one of said N phase windings, and a control electrode for controlling the turning on and off of the first switch means; and
a plurality of second switch means, each said second switch means having a first electrode for connection to a second DC potential, a second electrode for connection to the second terminal of one of said N phase windings, and a control electrode for controlling the turning on and off of the second switch means, the method comprising the steps in sequence in time for each excitation period:
turning ON the first and second switch means respectively associated with the excited phase winding;
toggling ON and OFF one of the first and second switch means respectively associated with the excited phase winding; and
turning OFF the first and second switch means respectively associated with the excited phase winding.

30. A method for controlling flow of current in a switched reluctance (SR) machine having N phase windings, where N is greater than or equal to 2, said driving circuit comprising:
N phase windings each having first and second terminals, wherein said respective second terminal of each of the phase windings, except the Nth phase winding, is connected to the respective first terminal of the next consecutive phase winding;
a plurality of first switch means, each said first switch means having a first electrode for connection to a first DC potential, a second electrode for connection to the first terminal of one of said N phase windings, and a control electrode for controlling the turning on and off of the first switch means; and
a plurality of second switch means, each said second switch means having a first electrode for connection to a second DC potential, a second electrode for connection to the second terminal of one of said N phase windings, and a control electrode for controlling the turning on and off of the second switch means, the method comprising the steps in sequence in time for each excitation period:
turning ON the first and second switch means respectively associated with the excited phase winding;
toggling ON and OFF one of the first and second switch means respectively associated with the excited phase winding; and
turning ON the first switch means respectively associated with a phase winding concluding an excitation period, turning OFF the second switch means respectively associated with the phase winding concluding an excitation period, and turning ON the second switch means respectively associated with a phase winding beginning an excitation period.

31. A method for controlling flow of current in a switched reluctance (SR) machine having N phase windings, where N is greater than or equal to 2, said driving circuit comprising:
N phase windings each having first and second terminals, wherein said respective second terminal of each of the phase windings, except the Nth phase winding, is connected to the respective first terminal of the next consecutive phase winding;
a plurality of first switch means, each said first switch means having a first electrode for connection to a first DC potential, a second electrode for connection to the first terminal of one of said N phase windings, and a control electrode for controlling the turning on and off of the first switch means; and
a plurality of second switch means, each said second switch means having a first electrode for connection to a second DC potential, a second electrode for connection to the second terminal of one of said N phase windings, and a control electrode for controlling the turning on and off of the second switch means, said method comprising:
initiating excitation of a first phase winding by applying a positive voltage to the first phase winding;
maintaining a current through the first phase winding by alternating between: (a) application of a short circuit across the first phase winding, and (b) application of the positive voltage across the first phase winding; and
decreasing the current through the first phase winding while simultaneously initiating excitation of a second phase winding, wherein a negative voltage is applied to the first phase winding while a positive voltage is applied to the second phase winding.

32. A method according to claim 31, wherein said SR machine has 2 phase windings.

* * * * *